(12) United States Patent
Murakami

(10) Patent No.: US 10,516,561 B2
(45) Date of Patent: Dec. 24, 2019

(54) COMMUNICATION APPARATUS AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/180,525

(22) Filed: Nov. 5, 2018

(65) Prior Publication Data

US 2019/0075007 A1    Mar. 7, 2019

Related U.S. Application Data

(63) Continuation of application No. 15/925,438, filed on Mar. 19, 2018, now Pat. No. 10,158,520, which is a
(Continued)

(30) Foreign Application Priority Data

Oct. 20, 2015    (JP) .................. 2015-206449

(51) Int. Cl.
*H04B 7/04*    (2017.01)
*H04L 27/26*    (2006.01)
(Continued)

(52) U.S. Cl.
CPC ........... *H04L 27/2692* (2013.01); *H04B 7/04* (2013.01); *H04B 7/0452* (2013.01);
(Continued)

(58) Field of Classification Search
CPC ............. H04L 27/2634; H04L 27/2646; H04L 27/2626; H04L 27/2662; H04L 27/2675;
(Continued)

(56) References Cited

U.S. PATENT DOCUMENTS 10,237,887 B2 *  3/2019  Jung ................... H04W 72/046
2002/0159506 A1 * 10/2002  Alamouti ............. H04B 7/0617
                                                        375/147
(Continued)

FOREIGN PATENT DOCUMENTS

WO    2013/165149 A1    11/2013
WO    2014/126773 A1    8/2014

OTHER PUBLICATIONS

International Search Report, dated Nov. 22, 2016, for corresponding International Application No. PCT/JP2016/004129, 3 pages.
(Continued)

*Primary Examiner* — Emmanuel Bayard
(74) *Attorney, Agent, or Firm* — Seed IP Law Group LLP

(57) ABSTRACT

A communication apparatus includes a receiver and a decoder. The receiver includes a plurality of antenna elements and, in operation, receives from a base station apparatus a modulated signal mapped to one of a plurality of subframes defined in a frame corresponding to a communicable range to which the communication apparatus belongs. The plurality of subframes are defined by time-division, frequency-division, or time-and-frequency division of the frame. A maximum number of modulated signals that can be simultaneously transmitted in a subframe from the base station apparatus varies depending on the communicable range. The decoder, in operation, decodes the received modulated signal.

18 Claims, 30 Drawing Sheets

Related U.S. Application Data continuation of application No. PCT/JP2016/004129, filed on Sep. 12, 2016.

(51) Int. Cl.
| | |
|---|---|
| *H04J 3/00* | (2006.01) |
| *H04J 11/00* | (2006.01) |
| *H04B 7/0452* | (2017.01) |
| *H04B 7/06* | (2006.01) |
| *H04B 7/08* | (2006.01) |
| *H04W 72/04* | (2009.01) |

(52) U.S. Cl.
CPC ........... *H04B 7/0617* (2013.01); *H04B 7/086* (2013.01); *H04J 3/00* (2013.01); *H04J 11/00* (2013.01); *H04J 11/003* (2013.01); *H04L 27/262* (2013.01); *H04L 27/2662* (2013.01); *H04L 27/2675* (2013.01); *H04L 27/2626* (2013.01); *H04W 72/0446* (2013.01)

(58) Field of Classification Search
CPC . H04L 27/2692; H04B 7/0452; H04B 7/0617; H04B 7/04; H04W 72/0446
USPC ........................................................ 375/260
See application file for complete search history.

(56) References Cited

U.S. PATENT DOCUMENTS

| | | | |
|---|---|---|---|
| 2012/0039270 | A1 | 2/2012 | Nguyen et al. |
| 2012/0039409 | A1 | 2/2012 | Popovic et al. |
| 2014/0044056 | A1* | 2/2014 | Chen ...................... H04W 72/04 370/329 |
| 2014/0244245 | A1 | 8/2014 | Briot |
| 2014/0286302 | A1* | 9/2014 | Khoryaev ............. H04W 28/24 370/330 |
| 2015/0071365 | A1* | 3/2015 | Gao ........................ H04L 5/003 375/260 |
| 2015/0181440 | A1* | 6/2015 | Chen ...................... H04W 16/18 370/329 |
| 2015/0249995 | A1 | 9/2015 | Park et al. |
| 2015/0351116 | A1* | 12/2015 | Shoshan ............. H04B 7/15542 370/330 |
| 2016/0050003 | A1 | 2/2016 | Ko et al. |
| 2016/0225375 | A1 | 8/2016 | Purnhagen et al. |
| 2017/0230946 | A1 | 8/2017 | Kim et al. |
| 2018/0219591 | A1* | 8/2018 | Murakami ........... H04B 7/0413 |

OTHER PUBLICATIONS

Erik G. Larsson et al., "Massive MIMO for next generation wireless systems", IEEE Communications Magazine, vol. 52, No. 2, pp. 186-195, Feb. 19, 2014.

Extended European Search Report, dated Sep. 17, 2018, for the corresponding European Patent Application No. 16857071.1-1220 / 3367597, 10 pages.

\* cited by examiner

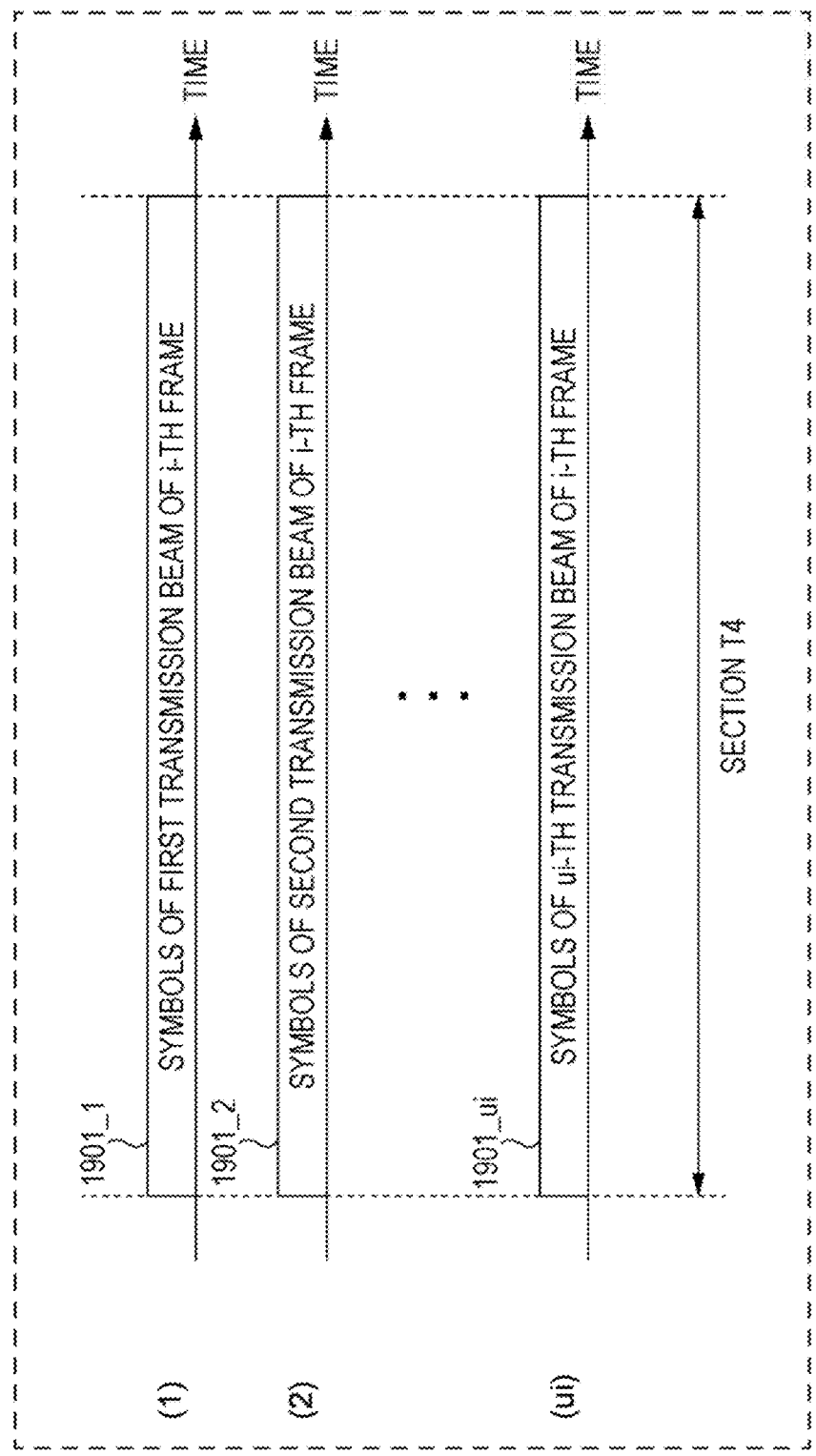

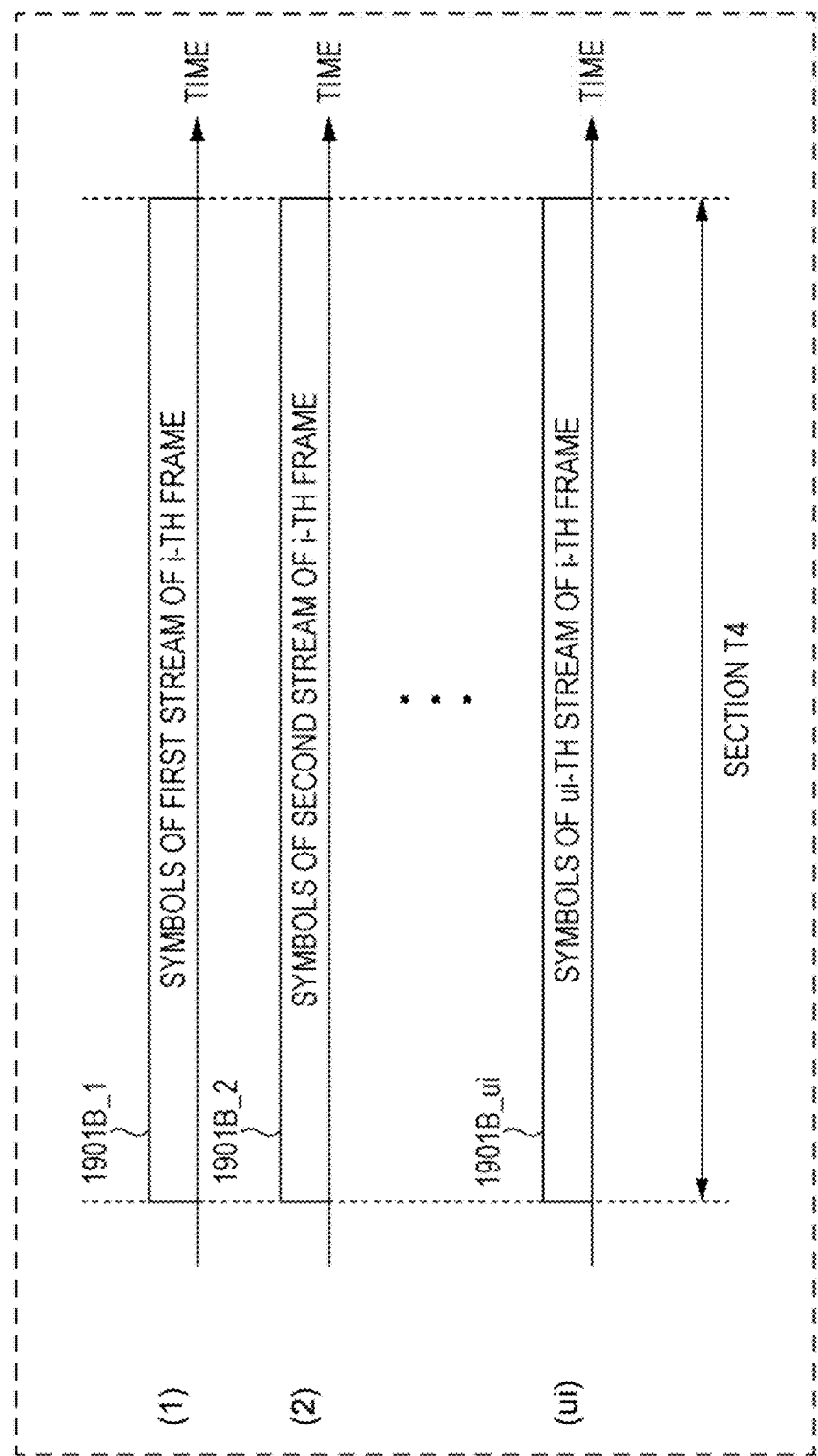

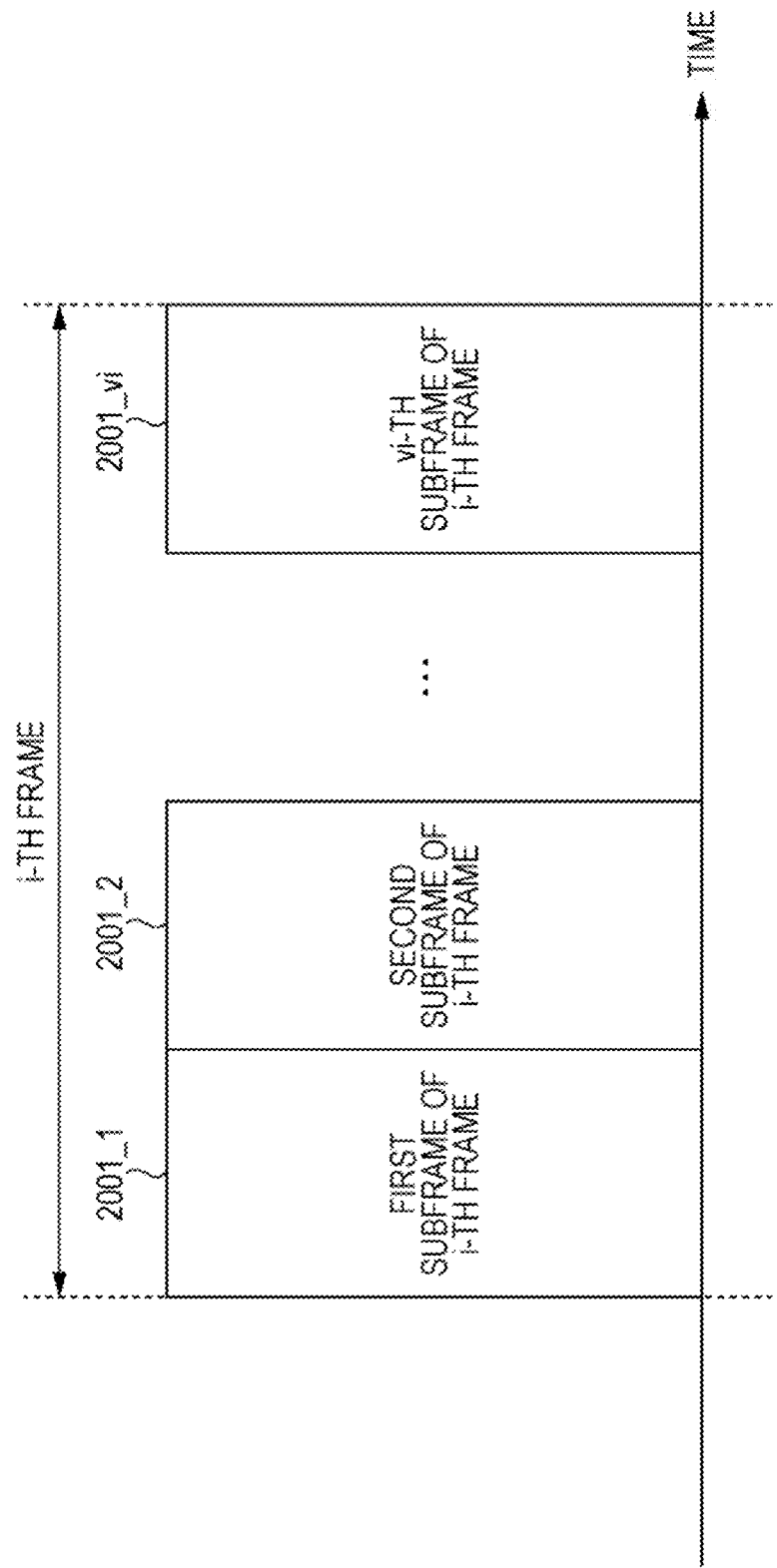

COMMUNICATION APPARATUS AND COMMUNICATION METHOD

BACKGROUND

1. Technical Field

The present disclosure relates to a communication apparatus and a communication method.

2. Description of the Related Art

In wireless communication, a massive multiple-input and multiple-output (MIMO) method, which is a transmission method in which a large number of antennas are used, is being examined in order to increase the capacity of base stations, access points, and the like.

In Japanese Unexamined Patent Application Publication (Translation of PCT Application) No. 2015-523757 and E. G. Larsson, O. Edfors, F. Tufvesson, and T. L. Marzetta, "Massive MIMO for next generation wireless systems", IEEE Communication Magazine, vol. 52, no. 2, pp. 186-195, February 2014, for example, a method for improving capacity by causing base stations and access points to generate a plurality of beams and simultaneously access a plurality of terminals is disclosed.

SUMMARY

Radio waves at frequencies of 5 GHz or higher, or more specifically radio waves in a 5 GHz band, a 20 GHz band, or a 60 GHz band, for example, attenuate faster than radio waves in a microwave band, and a communication distance range becomes narrower. In order to reduce the power consumption of the entire communication system or to reduce costs taken in the communication system, it is desired to "decrease the number of base stations and access points while securing communicable areas". As a method for achieving this, it is desirable to widen communication distance ranges of each of the base stations and each of the access points.

In Japanese Unexamined Patent Application Publication (Translation of PCT Application) No. 2015-523757 and E. G. Larsson, O. Edfors, F. Tufvesson, and T. L. Marzetta, "Massive MIMO for next generation wireless systems", IEEE Communication Magazine, vol. 52, no. 2, pp. 186-195, February 2014, however, an examination for widening communication distance ranges of base stations and access points when the massive MIMO method is used has not been carried out.

In one general aspect, the techniques disclosed here feature a communication apparatus for performing directive transmission using a plurality of antenna elements. The communication apparatus includes a signal processor that determines a transmission timing and/or a frequency for transmitting a modulated symbol sequence for each of a plurality of terminals, wherein the transmission timing and/or the frequency for each of the plurality of terminals is located within a frame corresponding to a communicable range to the terminal belongs, the frame being one of a plurality of frames defined by time and frequency bands and a weighting synthesizer that applies weights to each of the plurality of modulated symbol sequences and transmitting the weighed plurality of modulated symbol sequences from the plurality of antenna elements. The number of modulated symbol sequences that can be simultaneously transmitted in a same period of time and a same frequency band is different depending on communicable ranges in each of the plurality of frames, each of the plurality of frames including a plurality of subframes specified by performing time division and/or frequency division. The signal processor allocates, to each of the plurality of subframes, one or more modulated symbol sequences, the number of which is equal to or fewer than the number of modulated symbol sequences that can be simultaneously transmitted.

According to the aspect of the present disclosure, when the massive MIMO method is used, the number of base stations and access points can be decreased while securing communicable areas by widening communication distance ranges of base stations and access points.

It should be noted that these general or specific aspects may be implemented as a system, a method, an integrated circuit (IC), a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 19A is a diagram illustrating an example of transmission beams included in each frame;

FIG. 19B is a diagram illustrating an example of streams included in each frame;

FIG. 20 is a diagram illustrating a first example of the configuration of subframes of an i-th frame;

DETAILED DESCRIPTION

Embodiments of the present disclosure will be described in detail hereinafter with reference to the drawings. The following embodiments are examples, and the present disclosure is not limited to these embodiments.

Embodiment

Figure 1:
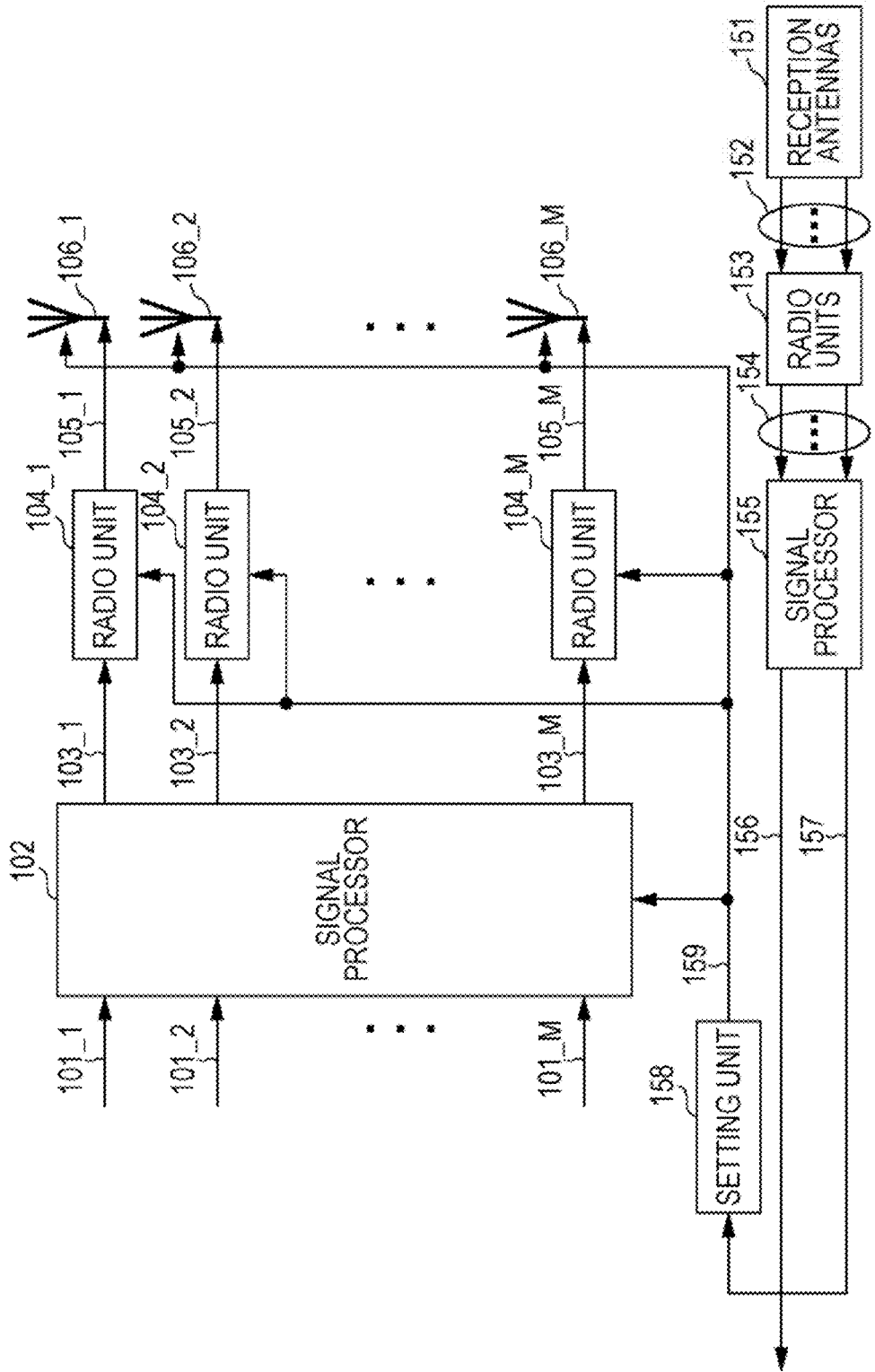
FIG. 1 is a diagram illustrating an example of the configuration of a base station according to an embodiment.

FIG. 1 is a diagram illustrating an example of the configuration of a base station according to the present embodiment. The base station illustrated in FIG. 1 may be an access point.

There are first to M-th pieces of information 101_1 to 101_M, respectively. That is, there is an m-th piece of information 101_$m$ (m is an integer equal to or larger than 1 but equal to or smaller than M, and M is an integer equal to or larger than 2). Not all of the first to M-th pieces of information, however, need to exist.

If there are a first terminal, a second terminal, . . . , and a U-th terminal (U is an integer equal to or smaller than M) as communication targets, an i-th piece of information "does not exist" or "is data to be transmitted to one of the terminals".

A signal processor 102 receives the first piece of information (101_1), the second piece of information (101_2), . . . , the M-th piece of information (101_M), and a control signal 159. The signal processor 102 processes signals on the basis of information such as "information regarding a method of error correction coding (e.g., a code rate or a code length (block length))", "information regarding a modulation method", "information regarding precoding", and a "transmission method (e.g., a multiplexing method)" included in the control signal 159. The signal processor 102 then outputs a processed signal 103_1, a processed signal 103_2, . . . , and a processed signal 103_M. That is, the signal processor 102 outputs a processed signal 103_$m$. Not all of the processed signals 103_1 to 103_M, however, need to exist.

At this time, the signal processor 102 performs error correction coding on the m-th piece of information (101_$m$) and then performs mapping using the determined modulation method. As a result, a baseband signal is obtained. The signal processor 102 then collects baseband signals corresponding to the pieces of information and performs precoding. Alternatively, the signal processor 102 may employ, for example, orthogonal frequency-division multiplexing (OFDM).

A radio unit 104_1 receives the processed signal 103_1 and the control signal 159, performs processing such as band limitation, frequency conversion, and amplification on the basis of the control signal 159, and outputs a modulated signal 105_1. The modulated signal 105_1 is output from an antenna unit 106_1 as a radio wave.

Similarly, a radio unit 104_2 receives the processed signal 103_2 and the control signal 159, performs processing such as band limitation, frequency conversion, and amplification on the basis of the control signal 159, and outputs a modulated signal 105_2. The modulated signal 105_2 is output from an antenna unit 106_2 as a radio wave.

Similarly, a radio unit 104_M receives the processed signal 103_M and the control signal 159, performs processing such as band limitation, frequency conversion, and amplification on the basis of the control signal 159, and outputs a modulated signal 105_M. The modulated signal 105_M is output from an antenna unit 106_M as a radio wave.

If there is no processed signal, the radio units need not perform the above processing.

Radio units 153 receive signals 152 received by reception antennas 151, perform processing such as frequency conversion, and output baseband signals 154. The received signals 152 include one or a plurality of received signals, the reception antennas 151 include one or a plurality of antennas, the radio units 153 include one or a plurality of radio units, and the baseband signals 154 include one or a plurality of baseband signals.

A signal processor 155 receives the baseband signals 154 and performs demodulation and error correction decoding. The signal processor 155 also performs processing such as time synchronization, frequency synchronization, and channel estimation. At this time, because the signal processor 155 receives and processes modulated signals transmitted from one or more terminals, the signal processor 155 obtains control information transmitted from the terminals as well as data transmitted from the terminals. The signal processor 155, therefore, outputs data 156 corresponding to the one or more terminals and control information 157 corresponding to the one or more terminals. The data 156 includes one or plurality of pieces of data, and the control information 157 includes one or plurality of pieces of control information.

A setting unit 158 receives the control information 157, determines a "method of error correction coding (e.g., a code rate or a code length (block length))", a "modulation method", a "precoding method", a "transmission method", "settings of antennas", and the like on the basis of the control information 157, and outputs a control signal 159 including the determined information.

The antennas 106_1, 106_2, . . . , and 106_M receive the control signal 159. The configuration of the antennas 106_1, 106_2, . . . , and 106_M will be described with reference to FIG. 2 while taking an antenna unit 106_*m* as an example.

Figure 2:
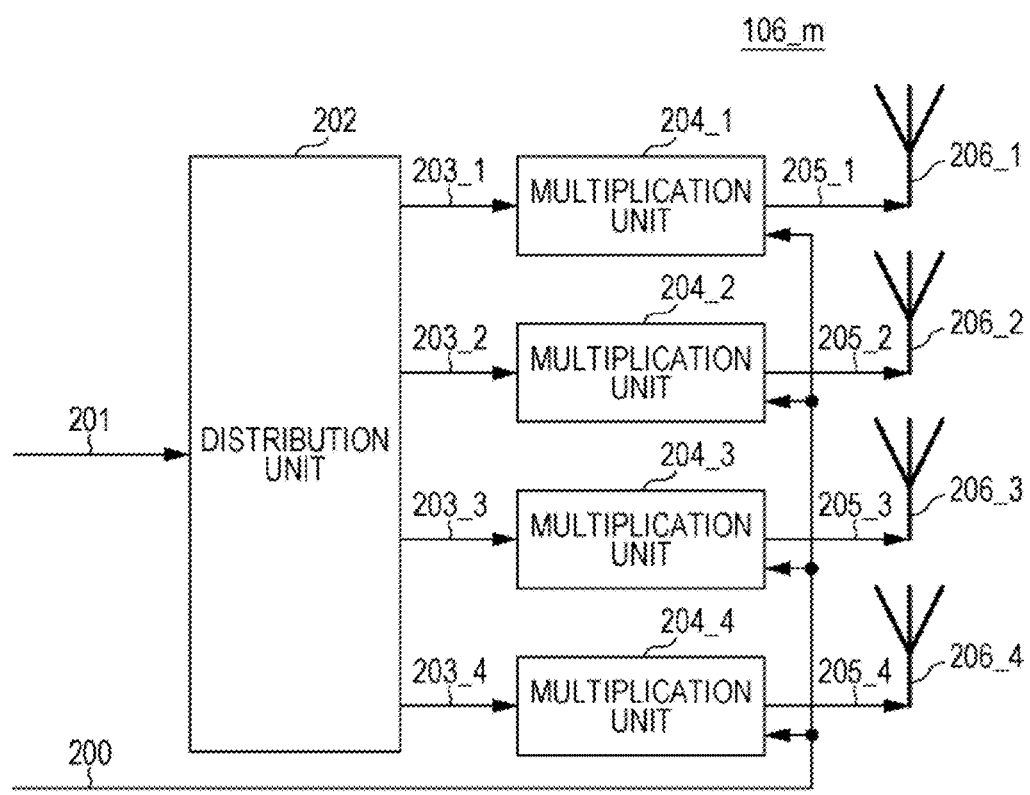
FIG. 2 is a diagram illustrating an example of the configuration of an antenna unit.

FIG. 2 is a diagram illustrating an example of the configuration of the antenna unit 106_*m*. The antenna unit 106_*m* is assumed to include a plurality of antennas as illustrated in FIG. 2. Although FIG. 2 illustrates four antennas, the number of antennas is not limited to four. It is sufficient that each of the antenna units 106_1, 106_2, . . . , and 106_M includes a plurality of antennas. In addition, the number of antennas included in each of the antenna units 106_1, 106_2, . . . , and 106_M need not be the same.

A distributor 202 receives a transmission signal 201 (corresponds to a modulated signal 105_*m* illustrated in FIG. 1), distributes the transmission signal 201, and outputs signals 203_1, 203_2, 203_3, and 203_4.

A multiplication unit 204_1 receives the signal 203_1 and a control signal 200 (corresponds to the control signal 159 illustrated in FIG. 1), multiplies the signal 203_1 by a coefficient W1 on the basis of information regarding a multiplication coefficient included in the control signal 200, and outputs a resultant signal 205_1. The coefficient W1 is defined by a complex number. W1, therefore, can be a real number. If the signal 203_1 is denoted by v1(*t*), the resultant signal 205_1 can be represented as W1×v1(*t*) (t denotes time). The resultant signal 205_1 is then output from an antenna 206_1 as a radio wave.

Similarly, a multiplication unit 204_2 receives the signal 203_2 and the control signal 200, multiplies the signal 203_2 by a coefficient W2 on the basis of the information regarding the multiplication coefficient included in the control signal 200, and outputs a resultant signal 205_2. The coefficient W2 is defined by a complex number. W2, therefore, can be a real number. If the signal 203_2 is denoted by v2(*t*), the resultant signal 205_2 can be represented as W2×v2(*t*). The resultant signal 205_2 is then output from an antenna 206_2 as a radio wave.

Similarly, a multiplication unit 204_3 receives the signal 203_3 and the control signal 200, multiplies the signal 203_3 by a coefficient W3 on the basis of the information regarding the multiplication coefficient included in the control signal 200, and outputs a resultant signal 205_3. The coefficient W3 is defined by a complex number. W3, therefore, can be a real number. If the signal 203_3 is denoted by v3(*t*), the resultant signal 205_3 can be represented as W3×v3(*t*). The resultant signal 205_3 is then output from an antenna 206_3 as a radio wave.

Similarly, a multiplication unit 204_4 receives the signal 203_4 and the control signal 200, multiplies the signal 203_4 by a coefficient W4 on the basis of the information regarding the multiplication coefficient included in the control signal 200, and outputs a resultant signal 205_4. The coefficient W4 is defined by a complex number. W4, therefore, can be a real number. If the signal 203_4 is denoted by v4(*t*), the resultant signal 205_4 can be represented as W4×v4(*t*). The resultant signal 205_4 is then output from an antenna 206_4 as a radio wave.

An absolute value of W1, an absolute value of W2, an absolute value of W3, and an absolute value of W4 may be the same.

The radio waves output from the antennas 206_1 to 206_4 are certain transmission beams.

In the configuration of the base station illustrated in FIGS. 1 and 2, a setting unit 158 determines the configuration of a frame, which will be described later. Information regarding the determined frame configuration is included in the control signal 159 to be output. The signal processor 102 assigns the processed signals to a frame on the basis of the information regarding the frame configuration included in the control signal 159. The radio units 104_1 to 104_M and the antenna units 106_1 to 106_M perform the processing on the basis of the information regarding the frame configuration included in the control signal 159 and a process for transmitting the signals in accordance with the frame configuration.

In the present embodiment, the configuration of a base station may be different from that described with reference to FIGS. 1 and 2.

Figure 3:
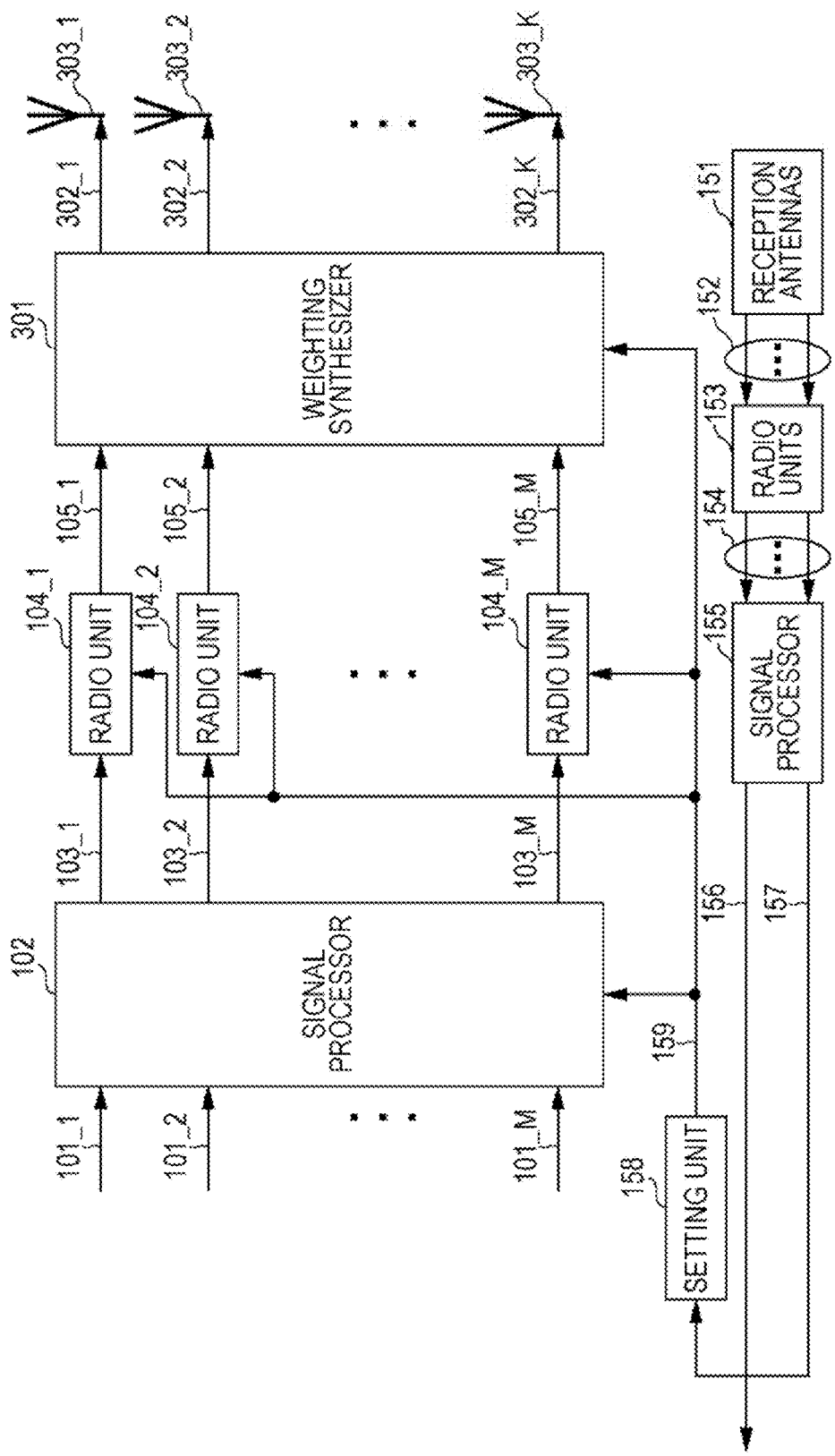
FIG. 3 is a diagram illustrating the configuration of a base station different from that illustrated in FIG. 1 according to the embodiment.

FIG. 3 is a diagram illustrating the configuration of a base station different from that illustrated in FIG. 1 according to the present embodiment. In FIG. 3, the same components as those illustrated in FIG. 1 are given the same reference numerals, and description thereof is omitted.

A weighting synthesizer 301 receives the modulated signal 105_1, the modulated signal 105_2, . . . , the modulated signal 105_M, and the control signal 159. The weighting synthesizer 301 then performs weighting synthesis on the modulated signal 105_1, the modulated signal 105_2, . . . , and the modulated signal 105_M on the basis of information regarding the weighting synthesis included in the control signal 159 and outputs resultant signals 302_1, 302_2, . . . , and 302_K (K is an integer equal to or larger than 1). The resultant signal 302_1 is output from an antenna 303_1 as a radio wave. Similarly, the resultant signal 302_2 is output from an antenna 303_2 as a radio wave. Similarly, the resultant signal 302_K is output from an antenna 303_K as a radio wave.

If the modulated signal 105_*m* is denoted by $x_m(t)$, a resultant signal 302_*k* (k is an integer equal to or larger than 1 but equal to or smaller than K) is denoted by $y_k(t)$, and a weighting coefficient is denoted by $A_{km}$, $y_k(t)$ is represented by the following expression (1) (t denotes time).

$$y_k(t) = A_{k1} \times x_1(t) + A_{k2} \times x_2(t) + \cdots + A_{kM} \times x_M(t) \quad (1)$$
$$= \sum_{m=1}^{M} A_{km} \times x_m(t)$$

In expression (1), $A_{km}$ is a value that can be defined by a complex number. $A_{km}$, therefore, can be a real number.

Next, the configuration a terminal according to the present embodiment will be described.

Figure 4:
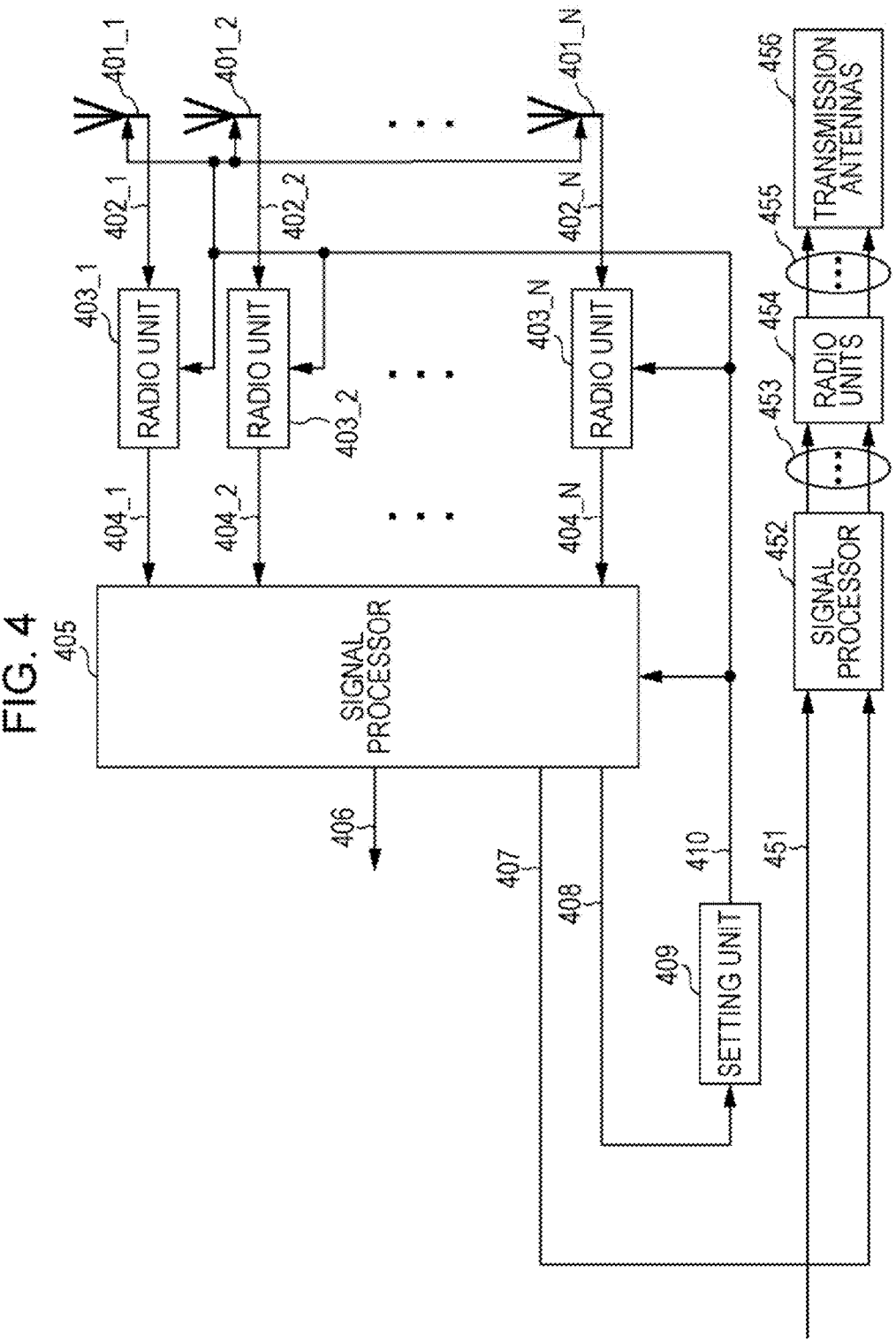
FIG. 4 is a diagram illustrating an example of the configuration of a terminal.

FIG. 4 is a diagram illustrating an example of the configuration of a terminal. Antenna units 401_1, 401_2, . . . , and 401_N receive a control signal 410 (N is an integer equal to or larger than 1).

A radio unit 403_1 receives a received signal 402_1 received by the antenna unit 401_1, performs processing such as frequency conversion on the received signal 402_1 on the basis of the control signal 410, and outputs a baseband signal 404_1.

Similarly, a radio unit 403_2 receives a received signal 402_2 received by the antenna unit 401_2, performs processing such as frequency conversion on the received signal 402_2 on the basis of the control signal 410, and outputs a baseband signal 404_2.

Similarly, a radio unit 403_N receives a received signal 402_N received by the antenna unit 401_N, performs processing such as frequency conversion on the received signal 402_N on the basis of the control signal 410, and outputs a baseband signal 404_N.

Not all the radio units 403_1, 403_2, . . . , and 403_N, however, need to operate. Not all the baseband signals 404_1, 404_2, . . . , and 404_N, therefore, might not exist.

A signal processor 405 receives the baseband signals 404_1, 404_2, . . . , and 404_N and the control signal 410, performs processing such as demodulation and error correction decoding on the basis of the control signal 410, and outputs data 406, transmission control information 407, and control information 408. The signal processor 405 also performs processing such as time synchronization, frequency synchronization, and channel estimation.

A setting unit 409 receives the control information 408, makes settings relating to a reception method, and outputs the control signal 410.

A signal processor 452 receives information 451 and the transmission control information 407, performs processing such as error correction coding and mapping based on a determined modulation method, and outputs baseband signals 453.

Radio units 454 receive the baseband signals 453, perform processing such as band limitation, frequency conversion, and amplification, and outputs transmission signals 455. The transmission signals 455 are output from transmission antennas 456 as radio waves. The radio units 454 include one or a plurality of radio units, the baseband signals 453 include one or a plurality of baseband signals, the transmission signals 455 include one or a plurality of transmission signals, and the transmission antennas 456 include one or a plurality of antennas.

Next, the configuration of the antennas 401_1, 401_2, . . . , and 401_N will be described with reference to FIG. 2 while taking an antenna unit 401_$n$ (n is an integer equal to or larger than 1 but equal to or smaller than N) as an example.

Figure 5:
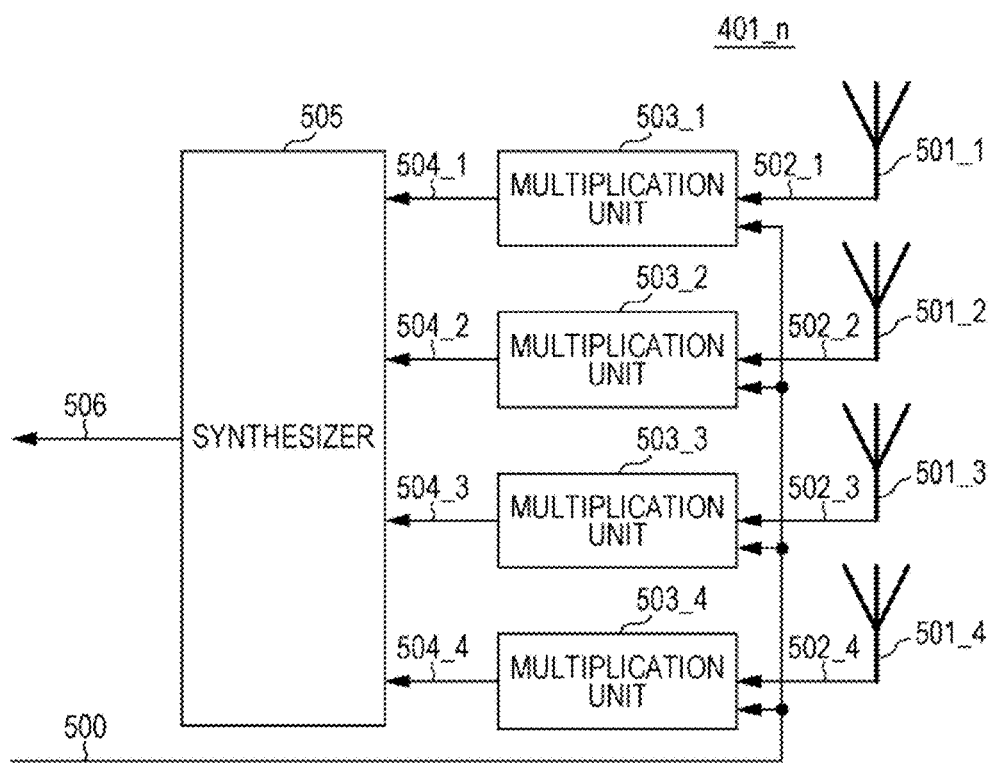
FIG. 5 is a diagram illustrating an example of the configuration of an antenna unit.

FIG. 5 is a diagram illustrating an example of the configuration of the antenna unit 401_$n$. As illustrated in FIG. 5, the antenna unit 401_$n$ is assumed to include a plurality of antennas. Although FIG. 5 illustrates four antennas, the number of antennas is not limited to four. It is sufficient that each of the antenna units 401_1, 401_2, . . . , and 401_N includes a plurality of antennas. In addition, the number of antennas included in each of the antenna units 401_1, 401_2, . . . , and 401_N need not be the same.

A multiplication unit 503_1 receives a received signal 502_1 received by an antenna 501_1 and a control signal 500 (corresponds to the control signal 410 illustrated in FIG. 4), multiplies the received signal 502_1 by a coefficient D1 on the basis of information regarding a multiplication coefficient included in the control signal 500, and outputs a resultant signal 504_1. The coefficient D1 is defined by a complex number. D1, therefore, can be a real number. If the received signal 502_1 is denoted by e1($t$), the resultant signal 504_1 can be represented as D1×e1($t$) (t denotes time).

Similarly, a multiplication unit 503_2 receives a received signal 502_2 received by an antenna 501_2 and the control signal 500, multiplies the received signal 502_2 by a coefficient D2 on the basis of the information regarding the multiplication coefficient included in the control signal 500, and outputs a resultant signal 504_2. The coefficient D2 can be defined by a complex number. D2, therefore, can be a real number. If the received signal 502_2 is denoted by e2($t$), the resultant signal 504_2 can be represented as D2×e2($t$).

Similarly, a multiplication unit 503_3 receives a received signal 502_3 received by an antenna 501_3 and the control signal 500, multiplies the received signal 502_3 by a coefficient D3 on the basis of the information regarding the multiplication coefficient included in the control signal 500, and outputs a resultant signal 504_3. The coefficient D3 can be defined by a complex number. D3, therefore, can be a real number. If the received signal 502_3 is denoted by e3($t$), the resultant signal 504_3 can be represented as D3×e3($t$).

Similarly, a multiplication unit 503_4 receives a received signal 502_4 received by an antenna 501_4 and the control signal 500, multiplies the received signal 502_4 by a coefficient D4 on the basis of the information regarding the multiplication coefficient included in the control signal 500, and outputs a resultant signal 504_4. The coefficient D4 can be defined by a complex number. D4, therefore, can be a real number. If the received signal 502_4 is denoted by e4($t$), the resultant signal 504_4 can be represented as D4×e4($t$).

A synthesizer 505 receives the resultant signals 504_1, 504_2, 504_3, and 504_4, adds the resultant signals 504_1, 504_2, 504_3, and 504_4 together, and outputs a resultant signal 506 (corresponds to a received signal 402_$i$ illustrated in FIG. 4). The resultant signal 506 is represented as D1×e1 ($t$), +D2×e2($t$)+D3×e3($t$)+D4×e4($t$).

In the present embodiment, the configuration of a terminal may be different from that described with reference to FIGS. 4 and 5.

Figure 6:
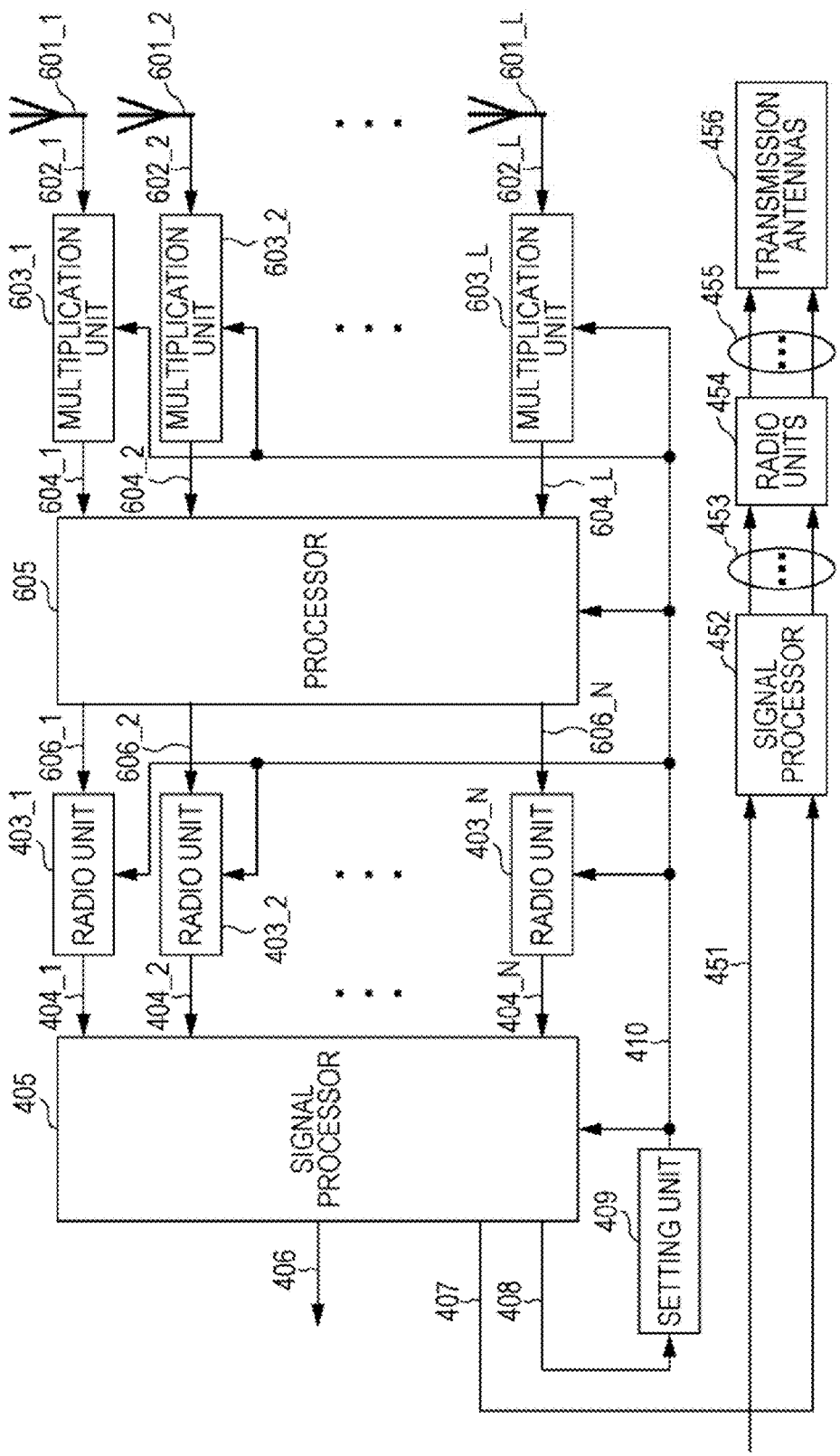
FIG. 6 is a diagram illustrating the configuration of a terminal different from that illustrated in FIG. 4 according to the embodiment.

FIG. 6 is a diagram illustrating the configuration of a terminal different from that illustrated in FIG. 4 according to the present embodiment. In FIG. 6, the same components as those illustrated in FIG. 4 are given the same reference numerals, and description thereof is omitted.

A multiplication unit 603_1 receives a received signal 602_1 received by an antenna 601_1 and the control signal 410, multiplies the received signal 602_1 by a coefficient G1 on the basis of information regarding a multiplication coefficient included in the control signal 410, and outputs a resultant signal 604_1. The coefficient G1 can be defined by a complex number. G1, therefore, can be a real number. If the received signal 602_1 is denoted by c1($t$), the resultant signal 604_1 can be represented as G1×c1($t$) (t denotes time).

Similarly, a multiplication unit 603_2 receives a received signal 602_2 received by an antenna 601_2 and the control signal 410, multiplies the received signal 602_2 by a coefficient G2 on the basis of the information regarding the multiplication coefficient included in the control signal 410, and outputs a resultant signal 604_2. The coefficient G2 can be defined by a complex number. G2, therefore, can be a real number. If the received signal 602_2 is denoted by c2($t$), the resultant signal 604_2 can be represented as G2×c2($t$).

Similarly, a multiplication unit 603_L receives a received signal 602_L received by an antenna 601_L and the control signal 410, multiplies the received signal 602_L by a coefficient GL on the basis of the information regarding the multiplication coefficient included in the control signal 410, and outputs a resultant signal 604_L. The coefficient GL can be defined by a complex number. GL, therefore, can be a real number. If the received signal 602_L is denoted by cL(t), the resultant signal 604_L can be represented as GL×cL(t).

Similarly, a multiplication unit 603_$l$ ($l$ is an integer equal to or larger than 1 but equal to or smaller than L, and L is an integer equal to or larger than 2) receives a received signal 602_$l$ received by an antenna 601_$l$ and the control signal 410, multiplies the received signal 602_$l$ by a coefficient GI on the basis of the information regarding the multiplication coefficient included in the control signal 410, and outputs a resultant signal 604_$l$. The coefficient GI can be defined by a complex number. GI, therefore, can be a real number. If the received signal 602_$l$ is denoted by cl($t$), the resultant signal 604_$l$ can be represented as GI×cl($t$).

A processor 605 receives the resultant signal 604_1, the resultant signal 604_2, ..., the resultant signal 604_L, and the control signal 410, processes signals on the basis of the control signal 410, and outputs processed signals 606_1, 606_2, ..., and 606_N (N is an integer equal to or larger than 2).

At this time, if a resultant signal 604_l is denoted by $p_l(t)$ and a processed signal 606_n is denoted by $r_n(t)$, $r_n(t)$ is represented by the following expression (2) (n is an integer equal to or larger than 1 but equal to or smaller than N).

$$r_n(t) = B_{n1} \times p_1(t) + B_{n2} \times p_2(t) + \cdots + B_{nL} \times p_L(t) \quad (2)$$

$$= \sum_{l=1}^{L} B_{nl} \times p_l(t)$$

In expression (2), $B_{nl}$ is a value that can be defined by a complex number. $B_{nl}$, therefore, can be a real number.

As described above, the base station and the terminals according to the present embodiment each include a plurality of antennas or an antenna unit including a plurality of antennas and can control directivity. A reception device of the terminal "need not control directivity". In this case, the terminal need not include a plurality of antennas. That is, the terminal includes one antenna. When the terminal includes one antenna, the base station controls directivity.

Next, a communication state when a base station and terminals are controlling the antenna directivity thereof in the present embodiment will be described.

Figure 7:
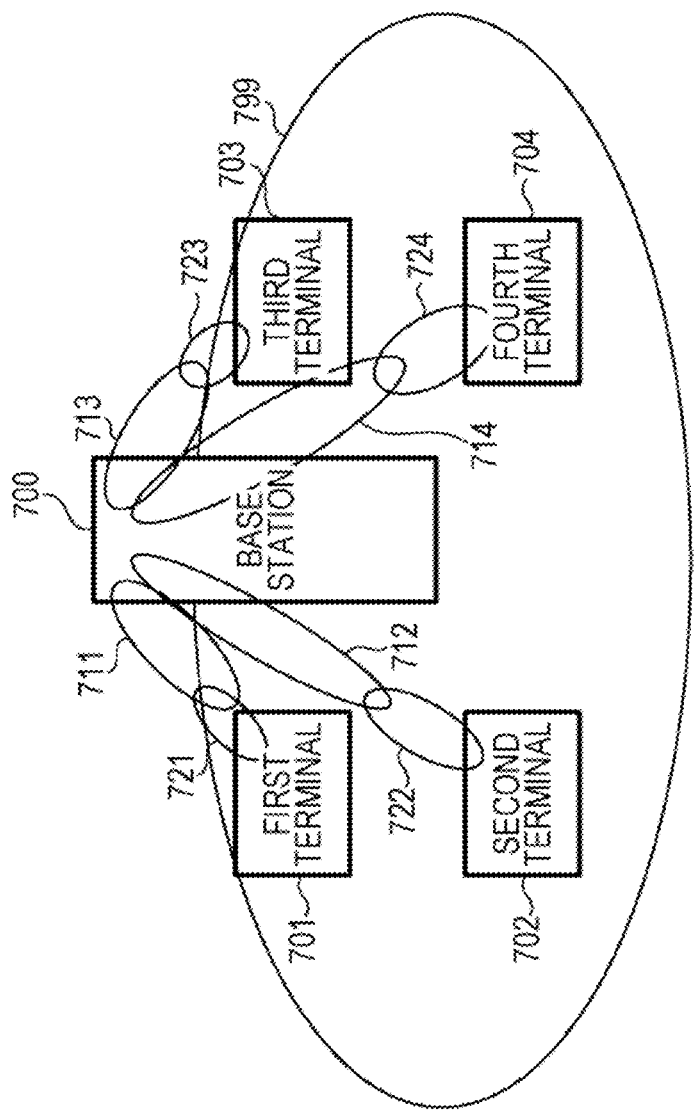
FIG. 7 is a diagram illustrating an example of a communication state at a time when a base station is transmitting four transmission beams.

FIG. 7 is a diagram illustrating an example of a communication state at a time when a base station 700 is transmitting four transmission beams. In FIG. 7, there are the base station 700 and first to fourth terminals 701 to 704, respectively. The base station 700 transmits a modulated signal for the first terminal (701), a modulated signal for the second terminal (702), a modulated signal for the third terminal (703), and a modulated signal for the fourth signal (704) using the same period of time and the same frequency (band). FIG. 7 illustrates a situation at this time.

The base station 700 directs an antenna to the first terminal (701) as indicated by a transmission beam 711, an antenna to the second terminal (702) as indicated by a transmission beam 712, an antenna to the third terminal (703) as indicated by a transmission beam 713, and an antenna to the fourth terminal (704) as indicated by a transmission beam 714. That is, the base station 700 directs the four transmission beams to the four terminals, respectively. In doing so, interference between the modulated signal for the first terminal (701), the modulated signal for the second terminal (702), the modulated signal for the third terminal (703), and the modulated signal for the fourth terminal (704) is reduced, and the first to fourth terminals can secure high data reception quality. In order to achieve this, the base station 700 has the configuration illustrated in FIG. 1 or 3.

Although the first terminal (701) directs an antenna to the base station 700 as indicated by a beam 721, the second terminal (702) directs an antenna to the base station 700 as indicated by a beam 722, the third terminal (703) directs an antenna to the base station 700 as indicated by a beam 723, and the fourth terminal (704) directs an antenna to the base station 700 as indicated by a beam 724 in FIG. 7, the directivity of the antennas is not limited to this.

An ellipse 799 illustrated in FIG. 7 indicates a limit of a communicable range of the terminals at a time when the base station 700 transmits four transmission beams (or modulated signals). When a terminal is located within the ellipse 799, the terminal can communicate with the base station 700.

Although the base station 700 transmits four transmission beams (or modulated signals) in FIG. 7, the transmission beams (or modulated signals) may be modulated symbol sequences, instead. In this case, in FIG. 7, the base station 700 transmits four modulated symbol sequences. The ellipse 799 indicates a limit of a communicable range at a time when the number of modulated symbol sequences that can be simultaneously transmitted in the same period of time and the same frequency band is four.

Although the limit of the communicable range has an elliptical shape in the present embodiment, a shape of the limit of the communicable range is not limited to an ellipse.

Figure 8:
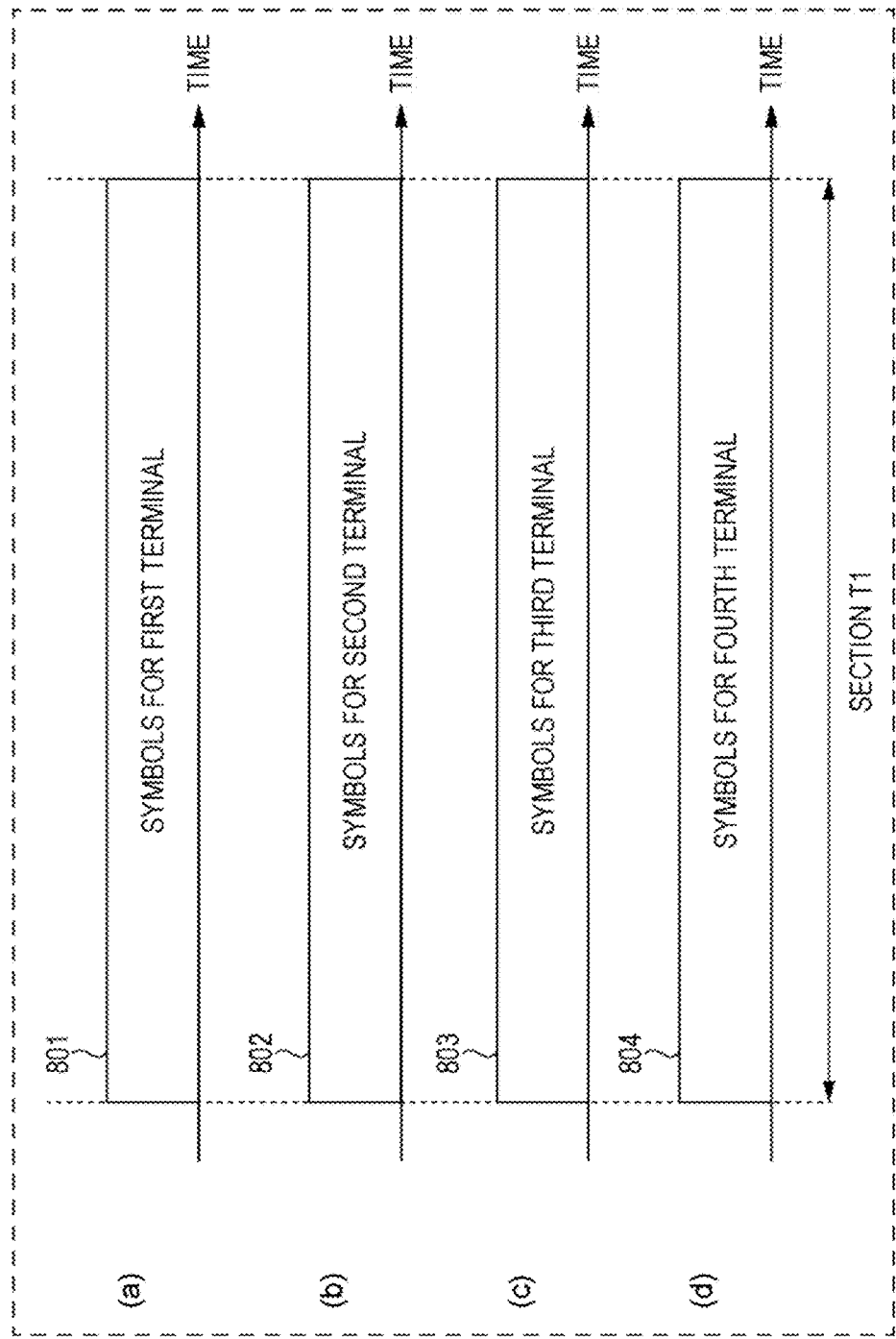
FIG. 8 is a diagram illustrating an example of a state of modulated signals transmitted from the base station in the communication state of the base station and terminals illustrated in FIG. 7.

FIG. 8 is a diagram illustrating an example of a state of the modulated signals transmitted from the base station 700 with the base station 700 and the terminals in the communication state illustrated in FIG. 7. In FIG. 8, a horizontal axis represents time. FIG. 8(a) illustrates an example of a frame of a modulated signal for the first terminal. FIG. 8(b) illustrates an example of a frame of a modulated signal for the second terminal. FIG. 8(c) illustrates an example of a frame of a modulated signal for the third terminal. FIG. 8(d) illustrates an example of a frame of a modulated signal for the fourth terminal.

As illustrated in FIG. 8, symbols 801 for the first terminal, symbols 802 for the second terminal, symbols 803 for the third terminal, and symbols 804 for the fourth terminal exist at least in a section T1 along the time axis. As described above, the base station 700 transmits the symbols 801 for the first terminal, the symbols 802 for the second terminal, the symbols 803 for the third terminal, and the symbols 804 for the fourth terminal using the same frequency (band). Such a transmission method is called multiuser MIMO (MU-MIMO).

As described above, the ellipse 799 illustrated in FIG. 7 indicates the limit of the communicable range at a time when the base station 700 transmits four transmission beams (or modulated signals). When the number of transmission beams (or modulated signals) transmitted from the base station 700 is different, the limit of the communicable range is different. This is because, as described later, there is a restriction on the average transmission power of a base station. Next, a limit of a communicable range when the base station 700 transmits two transmission beams (or modulated signals) will be described.

Figure 9:
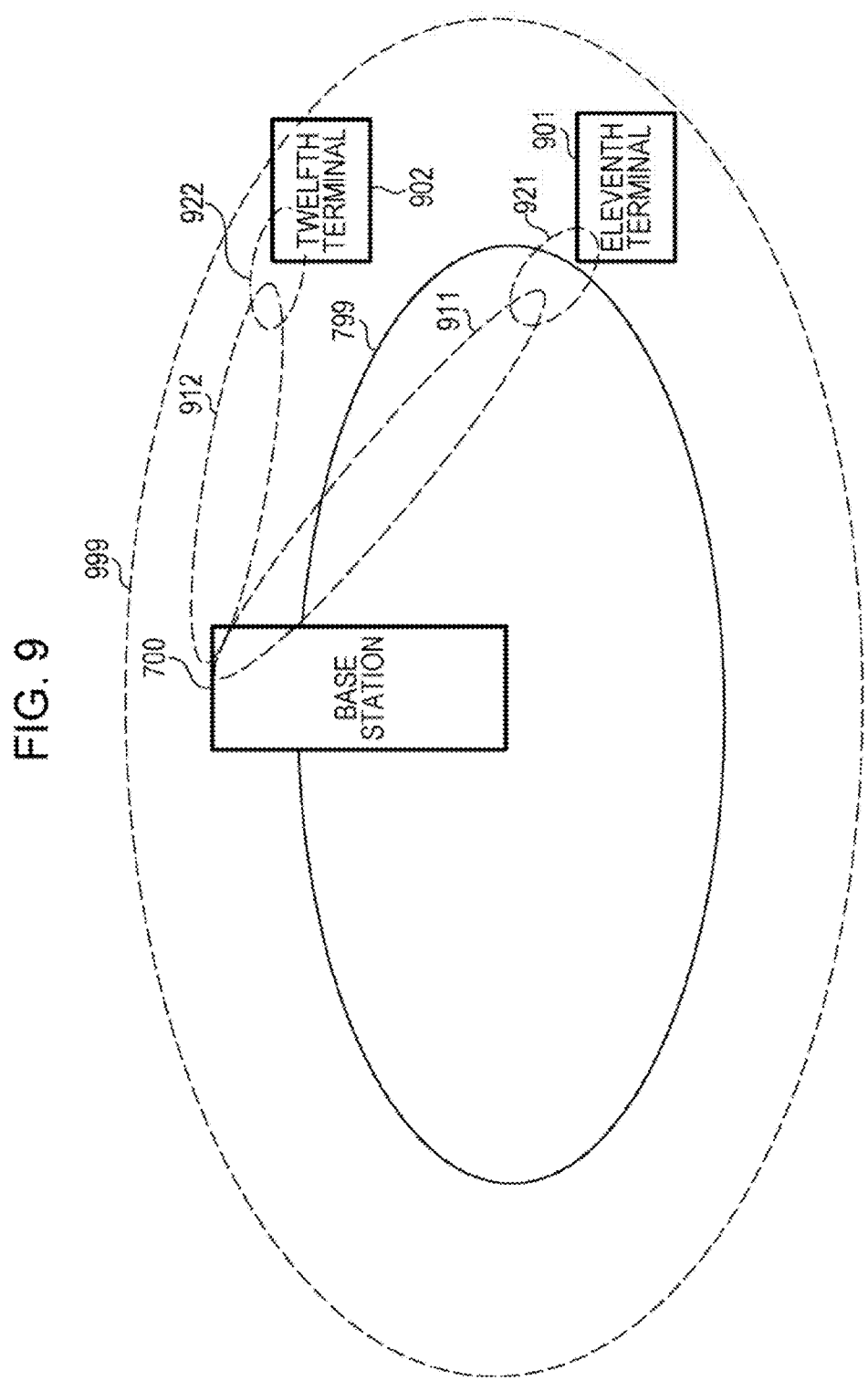
FIG. 9 is a diagram illustrating an example of a communication state at a time when the base station is transmitting two transmission beams.

FIG. 9 is a diagram illustrating an example of a communication state at a time when the base station 700 is transmitting two transmission beams. In FIG. 9, the base station 700 transmits a modulated signal for an eleventh terminal (901) and a modulated signal for a twelfth terminal (902) using the same period of time and the same frequency (band). FIG. 9 illustrates a situation at this time.

The base station 700 directs an antenna to the eleventh terminal (901) as indicated by a transmission beam 911 and an antenna to the twelfth terminal (902) as indicated by a transmission beam 912. In doing so, interference between the modulated signal for the eleventh terminal (901) and the modulated signal for the twelfth terminal (902) is reduced, and the eleventh and twelfth terminals can secure high data reception quality. In order to achieve this, for example, the base station 700 has the configuration illustrated in FIG. 1 or 3.

Although the eleventh terminal (901) directs an antenna to the base station 700 as indicated by a beam 921 and the twelfth terminal (902) directs an antenna to the base station 700 as indicated by a beam 922 in FIG. 9, the directivity of the antennas is not limited to this.

An ellipse 999 illustrated in FIG. 9 indicates a limit of a communicable range of the terminals at a time when the base station 700 transmits two transmission beams (or modulated signals). When a terminal is located within the ellipse 999, the terminal can communicate with the base station 700. For comparison, FIG. 9 also illustrates the "ellipse 799 indicating the limit of the communicable range of the terminals when the base station transmits four transmission beams (or modulated signals)" illustrated in FIG. 7.

An upper limit of the sum of average transmission power is determined to be a certain value regardless of the number of transmission beams (or the number of modulated signals to be transmitted). As the number of transmission beams to be transmitted from the base station increases, therefore, the limit of the communicable range of the terminals becomes closer to the base station. As a result, as illustrated in FIG. 9, the ellipse 799 indicating the "limit of the communicable range of the terminals when the base station transmits four transmission beams (or modulated signals)" is closer to the base station 700 than the ellipse 999 indicating the "limit of the communicable range of the terminals when the base station transmits two transmission beams (or modulated signals)" is.

Figure 10:
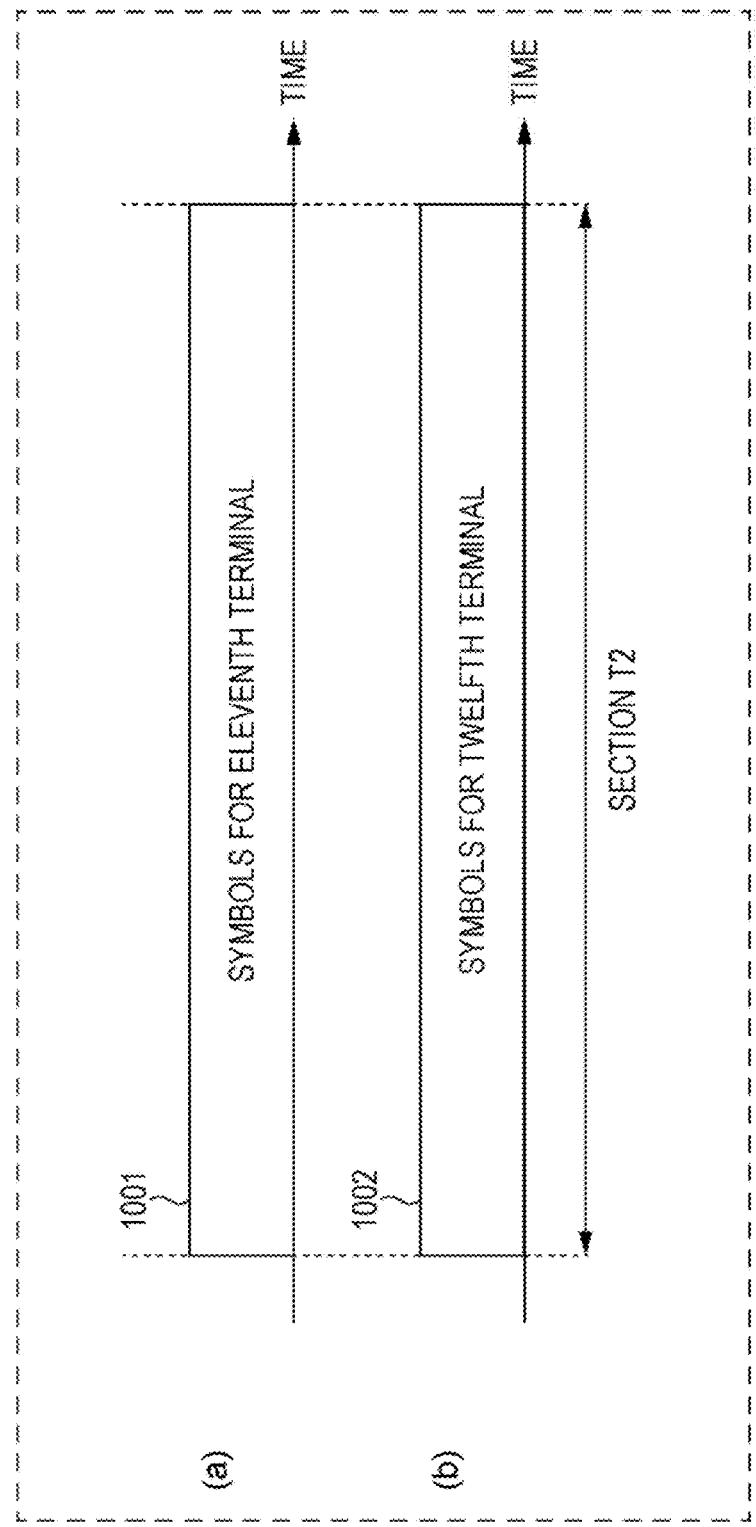
FIG. 10 is a diagram illustrating an example of a state of modulated signals transmitted from the base station in the communication state of the base station and terminals illustrated in FIG. 9.

FIG. 10 is a diagram illustrating an example of a state of the modulated signals transmitted from the base station 700 illustrated in FIG. 9 with the base station and the terminals in the communication state illustrated in FIG. 9. FIG. 10(a) illustrates an example of a frame of the modulated signal for the eleventh terminal over horizontal axis time. FIG. 10(b) illustrates an example of a frame of the modulated signal for the twelfth terminal over the horizontal axis time.

As illustrated in FIG. 10, symbols 1001 for the eleventh terminal and symbols 1002 for the twelfth terminal exist at least in a section T2 along the time axis. As described above, the base station transmits the symbols 1001 for the eleventh terminal and the symbols 1002 for the twelfth terminal using the same frequency (band).

Figure 11:
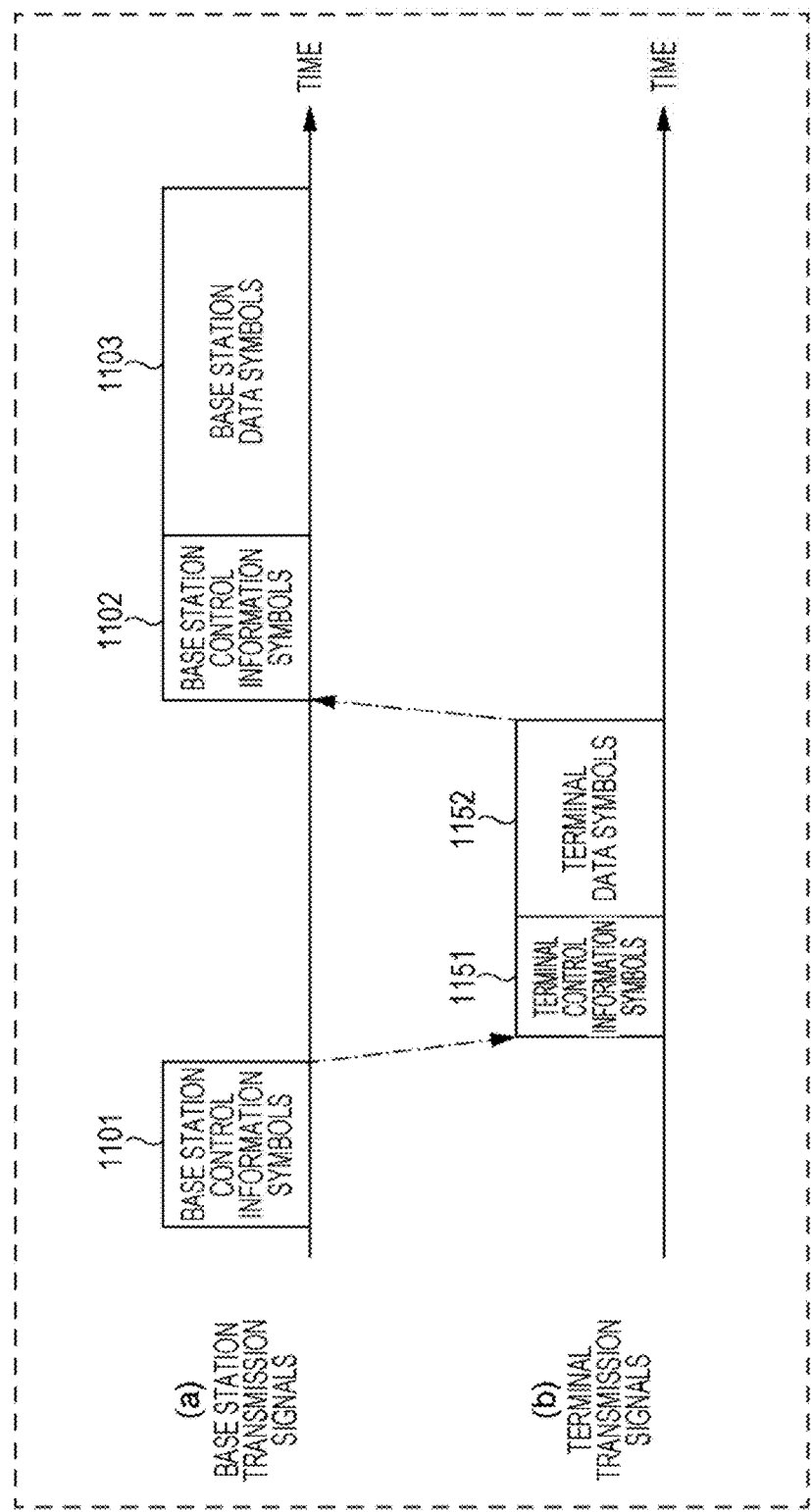
FIG. 11 is a diagram illustrating an example of communication performed between a base station and each terminal.

FIG. 11 is a diagram illustrating an example of communication between a base station and each terminal. FIG. 11(a) illustrates an example of transmission symbols transmitted from the base station over horizontal axis time. FIG. 11(b) illustrates an example of transmission symbols transmitted from the terminal over the horizontal axis time.

First, as illustrated in FIG. 11, the base station transmits, for example, base station control information symbols 1101. The symbols include, for example, PSK (Phase Shift Keying) symbols whose mapping is known to the terminal.

The terminal receives the base station control information symbols 1101 transmitted from the base station and performs estimation of a transmission environment (estimation of a channel state). The terminal then transmits terminal control information symbols 1151 including information regarding the channel state (e.g., channel state information (CSI)). The terminal may also transmit terminal data symbols 1152.

The base station receives the terminal control information symbols 1151 and the terminal data symbols 1152 transmitted from the terminal. The base station then obtains the information regarding the channel state included in the terminal control information symbols 1151 and a multiplication coefficient (e.g., one of the multiplication coefficients used by the multiplication units 204_1 to 204_4 illustrated in FIG. 2 or the coefficient for the weighting synthesis used by the weighting synthesizer 301 illustrated in FIG. 3) for generating transmission signals to be transmitted to the terminal. The base station transmits base station control information symbols 1102 and base station data symbols 1103. At this time, the base station generates a transmission beam using the obtained multiplication coefficient.

The base station generates transmission beams for a plurality of terminals by communicating the symbols illustrated in FIG. 11 with the plurality of terminal. As a result, the base station transmits the transmission beams illustrated in FIG. 7 or 9.

In the following description, too, a base station communicates with a terminal as illustrated in FIG. 11 when the base station transmits a transmission beam to the terminal. FIG. 11, however, illustrates just an example, and a method for sharing a transmission environment state of a modulated signal transmitted from a base station to a terminal is not limited to that illustrated in FIG. 11.

Figure 12:
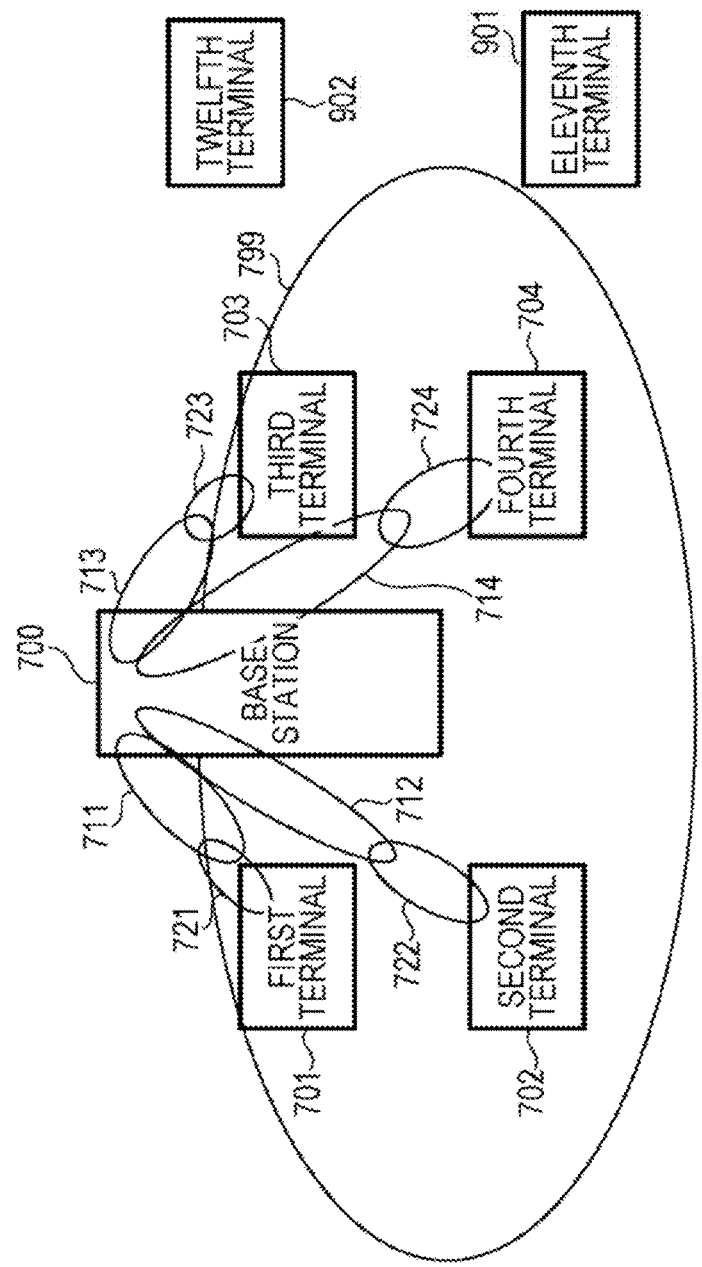
FIG. 12 is a diagram illustrating an example of a state of the base station and the terminals.

FIG. 12 is a diagram illustrating an example of a state of the base station and the terminals. The same components as those illustrated in FIG. 7 or 9 are given the same reference numerals. As described with reference to FIG. 7, it is assumed that the base station 700 is transmitting the modulated signal for the first terminal (701), the modulated signal for the second terminal (702), the modulated signal for the third terminal (703), and the modulated signal for the fourth terminal (704) using the same period of time and the same frequency (band). The base station 700, therefore, directs the antenna to the first terminal (701) as indicated by the transmission beam 711, the antenna to the second terminal (702) as indicated by the transmission beam 712, the antenna to the third terminal (703) as indicated by the transmission beam 713, and the antenna to the fourth terminal (704) as indicated by the transmission beam 714. That is, the base station 700 directs the four transmission beams to the four terminals, respectively. In this case, since the four terminals are located within the ellipse 799, which indicates the "limit of the communicable range of the terminals when the base station transmits four transmission beams (or modulated signals)", the base station 700 can communicate with the first terminal (701), the second terminal (702), the third terminal (703), and the fourth terminal (704).

Since the eleventh terminal (901) and the twelfth terminal (902) are located outside the ellipse 799, which indicates the "limit of the communicable range of the terminals when the base station transmits four transmission beams (or modulated signals)", it is assumed that the base station 700 is not communicating with the eleventh terminal (901) and the twelfth terminal (902).

Figure 13:
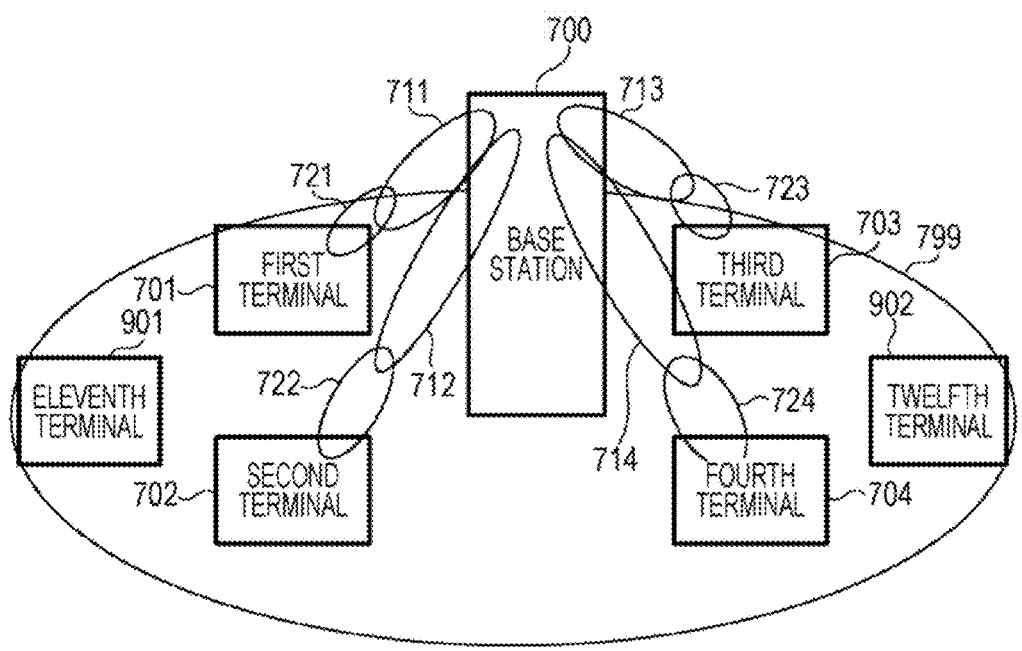
FIG. 13 is a diagram illustrating an example of the state of the base station and the terminals.

FIG. 13 is a diagram illustrating an example of the state of the base station and the terminals. The same components as those illustrated in FIG. 7 or 9 are given the same reference numerals. As described with reference to FIG. 7, it is assumed that the base station 700 is transmitting the modulated signal for the first terminal (701), the modulated signal for the second terminal (702), the modulated signal for the third terminal (703), and the modulated signal for the fourth terminal (704) using the same period of time and the same frequency (band). The base station 700, therefore, directs the antenna to the first terminal (701) as indicated by the transmission beam 711, the antenna to the second terminal (702) as indicated by the transmission beam 712, the antenna to the third terminal (703) as indicated by the transmission beam 713, and the antenna to the fourth terminal (704) as indicated by the transmission beam 714. That is, the base station 700 directs the four transmission beams to the four terminals, respectively. In this case, it is assumed that the base station 700 is communicating with the first terminal (701), the second terminal (702), the third terminal (703), and the fourth terminal (704). Since the four terminals are located within the ellipse 799, which indicates the "limit of the communicable range of the terminals when the base station transmits four transmission beams (or modulated signals)", the base station 700 can communicate with the first terminal (701), the second terminal (702), the third terminal (703), and the fourth terminal (704).

It is then assumed that, in this state, the base station 700 transmits the modulated signal for the first terminal (701), the modulated signal for the second terminal (702), the modulated signal for the third terminal (703), the modulated signal for the fourth terminal (704), the modulated signal for the eleventh terminal (901), and the modulated signal for the twelfth terminal (902) using the same period of time and the same frequency (band).

Figure 14:
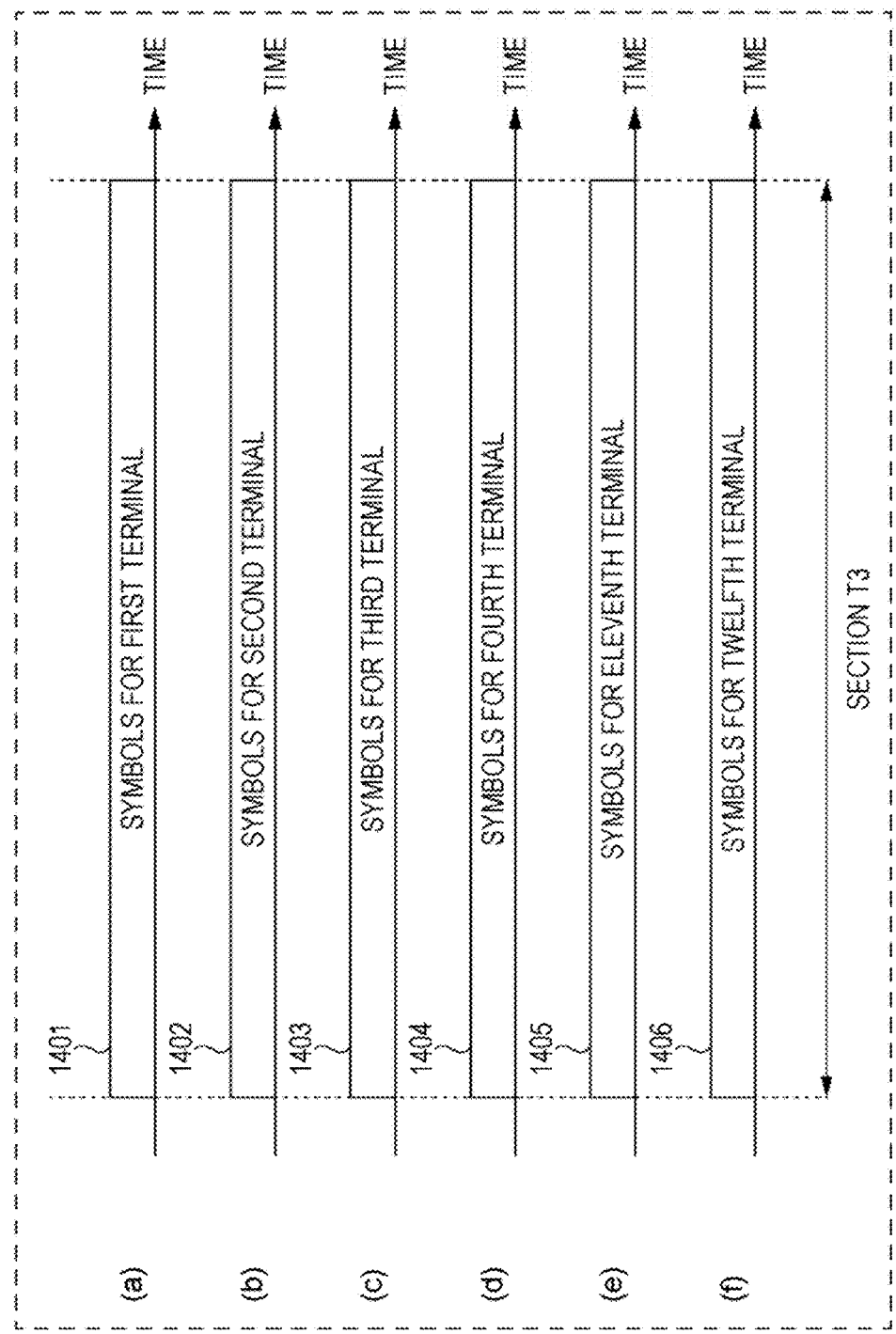
FIG. 14 is a diagram illustrating an example of a state of modulated signals transmitted from the base station.

FIG. 14 is a diagram illustrating an example of a state of the modulate signals transmitted from the base station 700. FIG. 14(a) illustrates an example of the frame configuration of the modulated signal for the first terminal over horizontal axis time. FIG. 14(b) illustrates an example of the frame configuration of the modulated signal for the second terminal over the horizontal axis time. FIG. 14(c) illustrates an example of the frame configuration of the modulated signal for the third terminal over the horizontal axis time. FIG. 14(d) illustrates an example of the frame configuration of the modulated signal for the fourth terminal over the horizontal axis time. FIG. 14(e) illustrates an example of the frame configuration of the modulated signal for the eleventh terminal over the horizontal axis time. FIG. 14(f) illustrates an example of the frame configuration of the modulated signal for the twelfth terminal over the horizontal axis time.

It is assumed in FIG. 14 that symbols 1401 for the first terminal, symbols 1402 for the second terminal, symbols 1403 for the third terminal, symbols 1404 for the fourth terminal, symbols 1405 for the eleventh terminal, and symbols 1406 for the twelfth terminal exist at least in a section T3. It is then assumed that the base station transmits the symbols 1401 for the first terminal, the symbols 1402 for the second terminal, the symbols 1403 for the third terminal, the symbols 1404 for the fourth terminal, the symbols 1405 for the eleventh terminal, and the symbols 1406 for the twelfth terminal using the same frequency (band).

When the base station 700 transmits the modulated signals illustrated in FIG. 14, the base station 700 transmits six transmission beams in FIG. 13. As described above, the ellipse 799 illustrated in FIG. 13 indicates the "limit of the communicable range of the terminals when the base station transmits four transmission beams (or modulated signals)". The limit of the communicable range of the terminals when the base station 700 transmits the modulated signals illustrated in FIG. 14, that is, the base station 700 transmits six transmission beams, is closer to the base station 700 than the ellipse 799 is. There can be a terminal, therefore, for which it is difficult to communicate with the base station 700, depending on positions of the first terminal (701), the second terminal (702), the third terminal (703), the fourth terminal (704), the eleventh terminal (901), and the twelfth terminal (902).

When the state illustrated in FIG. 12 is assumed, for example, it is difficult for a terminal whose distance from the base station 700 is larger than that of the ellipse 799, which indicates the "limit of the communicable range of the terminals when the base station transmits four transmission beams (or modulated signals)" from the base station 700 to communicate with the base station 700 in the communication mode illustrated in FIG. 7.

It is desired, therefore, to employ a transmission method for the base station that achieves more flexible communication than in the communication mode illustrated in FIG. 7 and expand a communicable distance range.

In addition, for example, the state illustrated in FIG. 13, that is, a state in which there are more terminals than transmission beams within the "limit of the communicable range of the terminals when the base station transmits a certain number of transmission beams (or modulated signals)" is assumed. If the base station is configured to transmit modulate signals to all the terminals using the same period of time and the same frequency in this state, a case might occur in which it is difficult for the base station to transmit the modulated signals to all the terminals using the same period of time and the same frequency band, since there is the upper limit of average transmission power that can be transmitted from the base station.

A transmission method effective to this problem will be described hereinafter.

Figure 15:
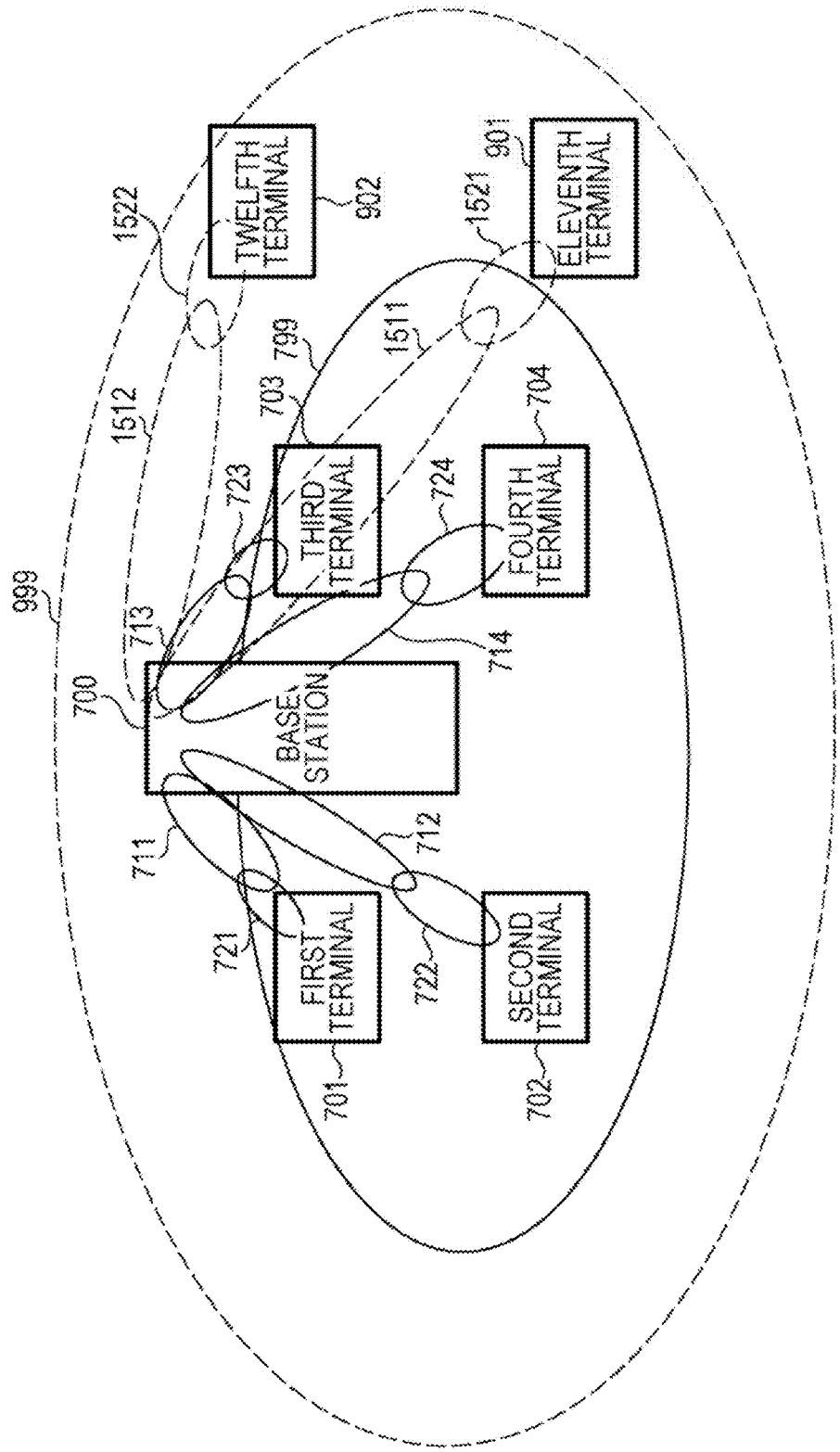
FIG. 15 is a diagram illustrating an example of the communication state of the base station and the terminals according to the present embodiment.

FIG. 15 is a diagram illustrating an example of the communication state of the base station and the terminals according to the present embodiment. In FIG. 15, the same components as those illustrated in FIG. 7 or 9 are given the same reference numerals, and description thereof is omitted.

The base station 700 transmits the transmission beam 711 for the first terminal (701), the transmission beam 712 for the second terminal (702), the transmission beam 713 for the third terminal (703), and the transmission beam 714 for the fourth terminal (704) using the same period of time (referred to as a period tt1) and the same frequency (band). At this time, the terminals may perform directivity control in such a way as to direct their respective beams (beams 721 to 724) to the base station 700. The base station 700 also transmits a transmission beam 1511 for the eleventh terminal (901) and a transmission beam 1512 for the twelfth terminal (902) using the same period of time (referred to as a period tt2) and the same frequency (band). At this time, the eleventh terminal (901) and the twelfth terminal (902) may perform directivity control in such a way as to direct their respective beams 1521 and 1522 to the base station 700. It is assumed that the period tt1 and the period tt2 are different from each other.

A method different from above will be described.

The base station 700 transmits the transmission beam 711 for the first terminal (701), the transmission beam 712 for the second terminal (702), the transmission beam 713 for the third terminal (703), and the transmission beam 714 for the fourth terminal (704) using the same period of time and the same frequency (band) (frequency (band) ff1). At this time, the terminals may perform directivity control in such a way as to direct their respective beams (beams 721 to 724) to the base station 700. The base station 700 also transmits the transmission beam 1511 for the eleventh terminal (901) and the transmission beam 1512 for the twelfth terminal (902) using the same period of time and the same frequency (band) (frequency (band) ff2). At this time, the eleventh terminal (901) and the twelfth terminal (902) may perform directivity control in such a way as to direct their respective beams 1521 and 1522 to the base station 700. It is assumed that the frequency (band) ff1 and the frequency (band) ff2 are different from each other.

The base station 700 thus, when transmitting four transmission beams, transmits the transmission beam for the first terminal (701), the transmission beam for the second terminal (702), the transmission beam for the third terminal (703), and the transmission beam for the fourth terminal (704). In this case, since the first terminal (701), the second terminal (702), the third terminal (703), and the fourth terminal (704) are located within the ellipse 799 indicating the "limit of the communicable range of the terminals when the base station transmits four transmission beams (or modulated signals)", the base station 700 can communicate with the first terminal (701), the second terminal (702), the third terminal (703), and the fourth terminal (704). In addition, the base station 700 transmits, when transmitting two transmission beams, transmits the transmission beam for the eleventh terminal (901) and the transmission beam for the twelfth terminal (902). Since the eleventh terminal (901) and the twelfth terminal (902) are located within the ellipse 999 indicating the "limit of the communicable range of the terminals when the base station transmits two transmission beams (or modulated signals)", the base station 700 can communicate with the eleventh terminal (901) and the twelfth terminal (902).

Another example of FIG. 15 will be described.

Figure 16:
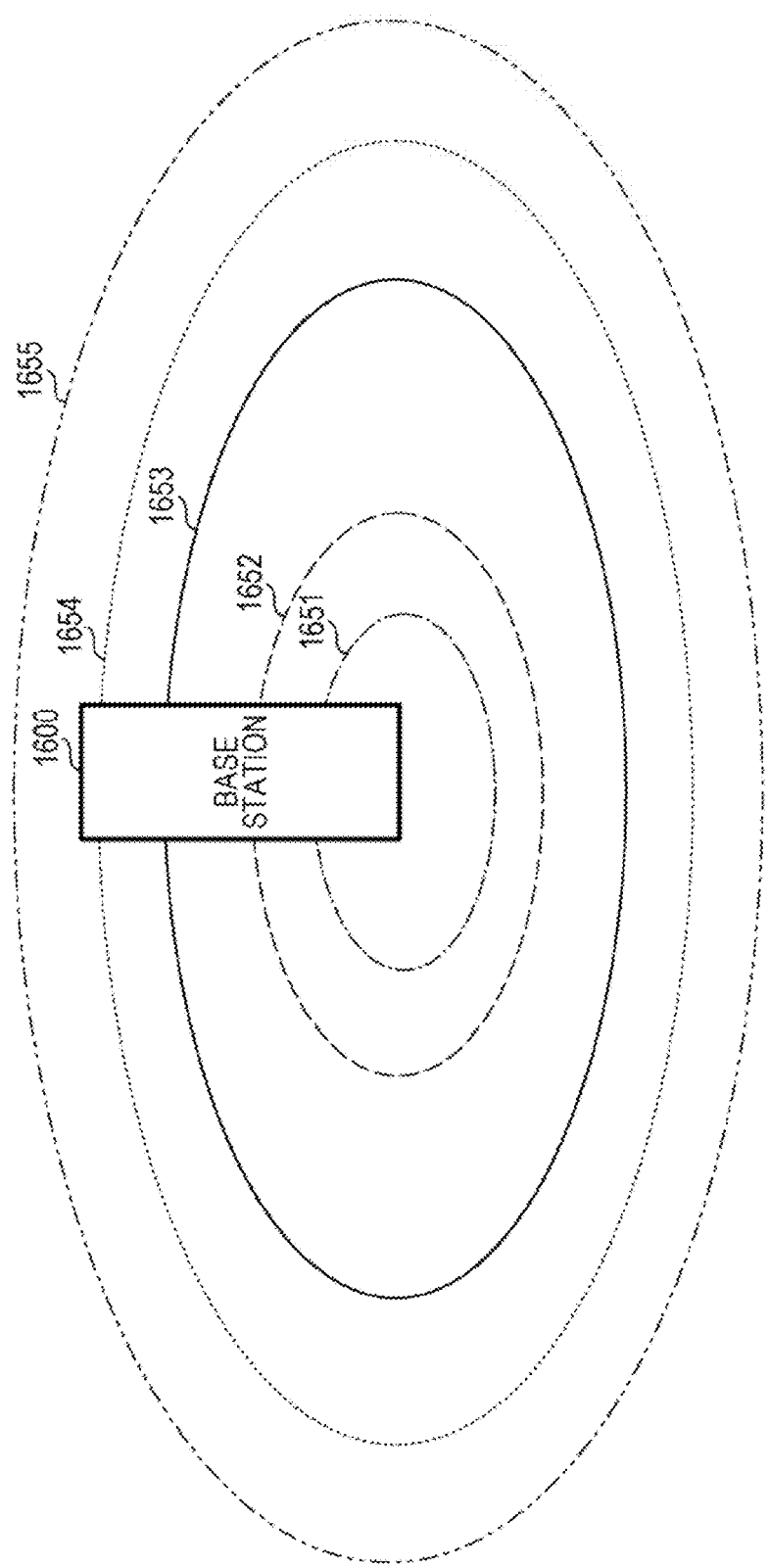
FIG. 16 is a diagram illustrating "limits of communicable ranges" of a base station.

FIG. 16 is a diagram illustrating "limits of communicable ranges" of a base station 1600. FIG. 16 illustrates ellipses indicating the "limits of the plurality of communicable ranges" around the base station 1600.

An ellipse 1651 indicates a "limit of a communicable range of terminals when the base station transmits sixteen transmission beams (or modulated signals)". Communication can be performed within the ellipse 1651 insofar as conditions are satisfied.

An ellipse 1652 indicates a "limit of a communicable range of terminals when the base station transmits eight transmission beams (or modulated signals)". Communication can be performed within the ellipse 1652 insofar as conditions are satisfied.

An ellipse 1653 indicates a "limit of a communicable range of terminals when the base station transmits four transmission beams (or modulated signals)". Communication can be performed within the ellipse 1653 insofar as conditions are satisfied.

An ellipse 1654 indicates a "limit of a communicable range of terminals when the base station transmits two transmission beams (or modulated signals)". Communication can be performed within the ellipse 1654 insofar as conditions are satisfied.

An ellipse 1655 indicates a "limit of a communicable range of a terminal when the base station transmits one transmission beam (or modulated signal)". Communication can be performed within the ellipse 1655 insofar as conditions are satisfied.

Figure 17:
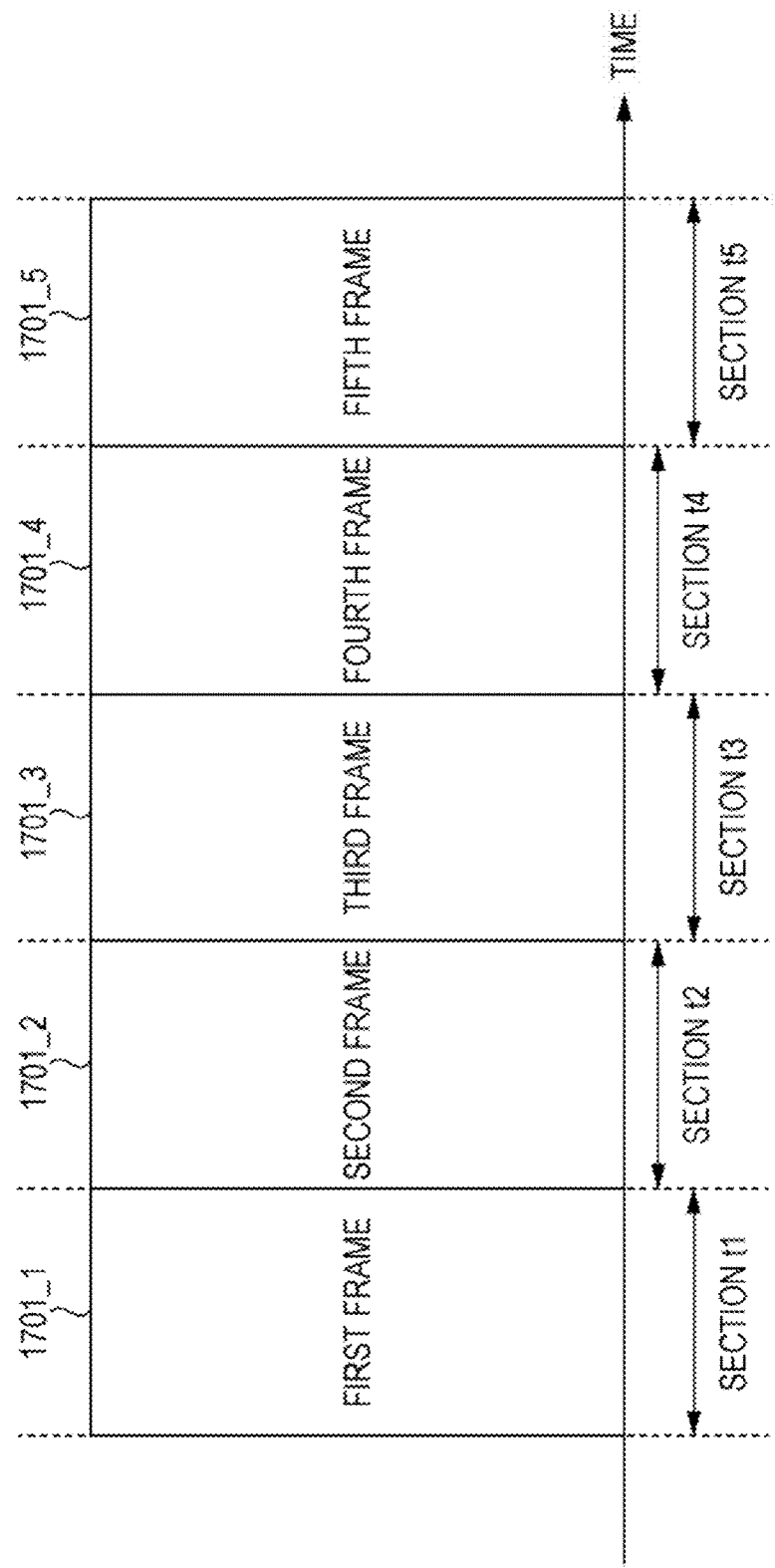
FIG. 17 is a diagram illustrating a first example of the "frame configuration of one or more transmission beams (or modulated signals)" transmitted from a base station.

FIG. 17 is a diagram illustrating a first example of the "frame configuration of one or more transmission beams (or modulated signals)" transmitted from a base station. The example illustrated in FIG. 17 is an example at a time when the limits of the five communicable ranges illustrated in FIG. 16 have been set.

In FIG. 17, a horizontal axis represents time. There are first to fifth frames 1701_1 to 1701_5, respectively. It is assumed that the first frame (1701_1), the second frame (1701_2), the third frame (1701_3), the fourth frame (1701_4), and the fifth frame (1701_5) have been subjected to time-division multiplexing (TDM).

At this time, the first frame (1701_1) is a "frame used by the base station to transmit up to 16 transmission beams (or modulated signals)". This frame is used to achieve a communicable area corresponding to an area within the ellipse 1651 illustrated in FIG. 16.

The second frame (1701_2) is a "frame used by the base station to transmit up to eight transmission beams (or modulated signals)". This frame is used to achieve a communicable area corresponding to an area inside the ellipse 1652 illustrated in FIG. 16.

The second frame (1701_3) is a "frame used by the base station to transmit up to four transmission beams (or modulated signals)". This frame is used to achieve a communicable area corresponding to an area inside the ellipse 1653 illustrated in FIG. 16.

The fourth frame (1701_4) is a "frame used by the base station to transmit up to two transmission beams (or modulated signals)". This frame is used to achieve a communicable area corresponding to an area inside the ellipse 1654 illustrated in FIG. 16.

The second frame (1701_5) is a "frame used by the base station to transmit one transmission beam (or modulated signal)". This frame is used to achieve a communicable area corresponding to an area inside the ellipse 1655 illustrated in FIG. 16.

The first frame (1701_1) exists in a time section t1, the second frame (1701_2) exists in a time section t2, the third frame (1701_3) exists in a time section t3, the fourth frame (1701_4) exists in a time section t4, and the fifth frame (1701_5) exists in a time section t5.

At this time, the time section t1, the time section t2, the time section t3, the time section t4, and the time section t5 may be fixed time sections, or may be set as necessary. For example, the time sections may be set in accordance with the number of terminals that the base station communicates with, positions of the terminals, or the like.

In FIG. 17, the first frame (1701_1), the second frame (1701_2), the third frame (1701_3), the fourth frame (1701_4), and the fifth frame (1701_5) are continuously arranged. Order in which the first frame (1701_1), the second frame (1701_2), the third frame (1701_3), the fourth frame (1701_4), and the fifth frame (1701_5) are transmitted is not limited to that illustrated in FIG. 17 and may be changed as necessary.

In FIG. 17, a multicarrier transmission method such as OFDM, for example, may be used. A single-carrier transmission method may be used, instead. A plurality of symbols, therefore, may exist along a frequency axis.

Figure 18:
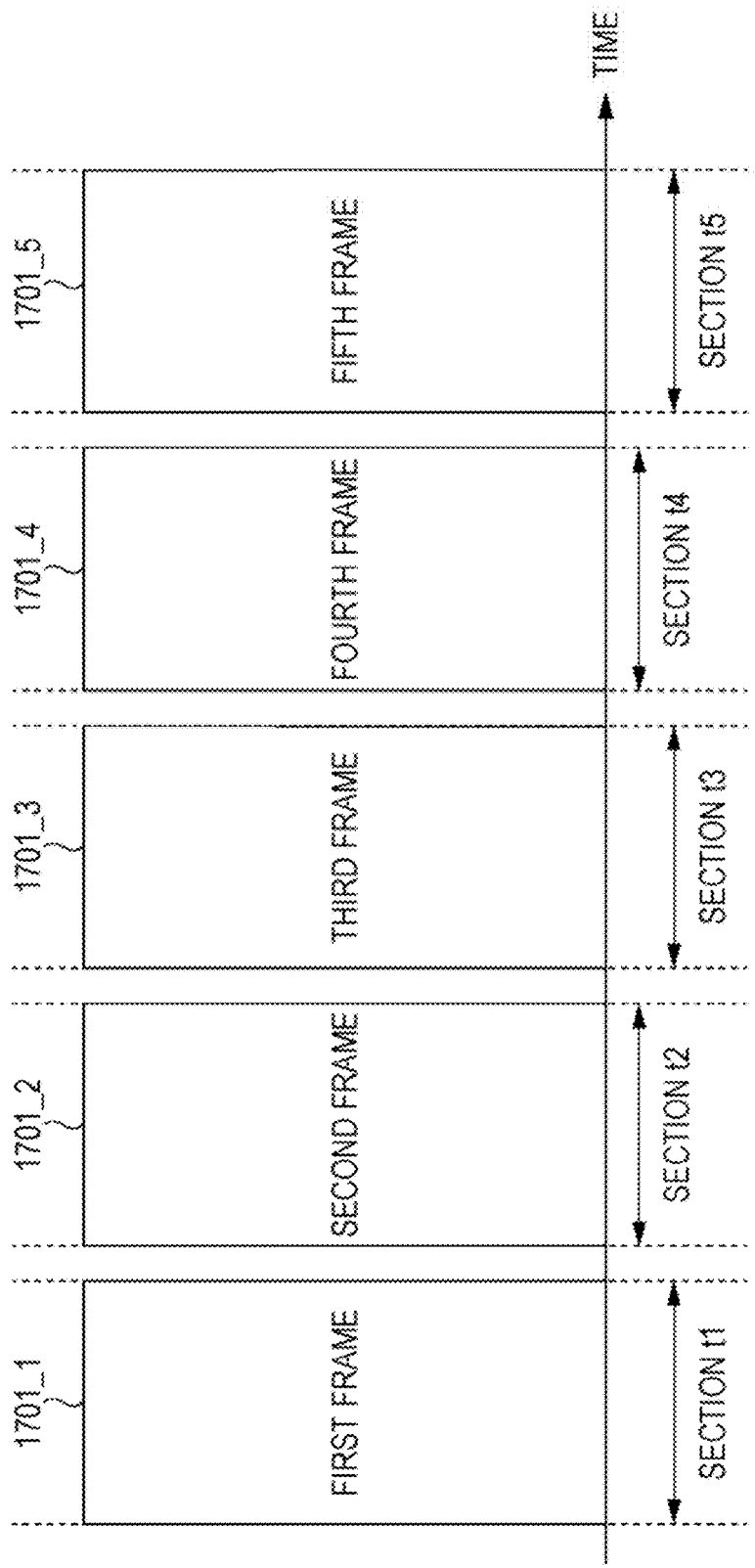
FIG. 18 is a diagram illustrating a second example of the "frame configuration of one or more transmission beams (or modulated signals)" transmitted from the base station.

FIG. 18 is a diagram illustrating a second example of the "frame configuration of one or more transmission beams (or modulated signals)" transmitted from a base station. The example illustrated in FIG. 18 is an example at a time when the limits of the five communicable ranges illustrated in FIG. 16 have been set.

In FIG. 18, a horizontal axis represents time. There are first to fifth frames 1701_1 to 1701_5, respectively. It is assumed that the first frame (1701_1), the second frame (1701_2), the third frame (1701_3), the fourth frame (1701_4), and the fifth frame (1701_5) have been subjected to TDM.

At this time, the first frame (1701_1) is a "frame used by the base station to transmit up to 16 transmission beams (or modulated signals)". This frame is used to achieve a communicable area corresponding to an area inside the ellipse 1651 illustrated in FIG. 16.

The second frame (1701_2) is a "frame used by the base station to transmit up to eight transmission beams (or modulated signals)". This frame is used to achieve a communicable area corresponding to an area inside the ellipse 1652 illustrated in FIG. 16.

The second frame (1701_3) is a "frame used by the base station to transmit up to four transmission beams (or modulated signals)". This frame is used to achieve a communicable area corresponding to an area inside the ellipse 1653 illustrated in FIG. 16.

The fourth frame (1701_4) is a "frame used by the base station to transmit up to two transmission beams (or modulated signals)". This frame is used to achieve a communicable area corresponding to an area inside the ellipse 1654 illustrated in FIG. 16.

The second frame (1701_5) is a "frame used by the base station to transmit one transmission beam (or modulated signal)". This frame is used to achieve a communicable area corresponding to an area inside the ellipse 1655 illustrated in FIG. 16.

The first frame (1701_1) exists in a time section t1, the second frame (1701_2) exists in a time section t2, the third frame (1701_3) exists in a time section t3, the fourth frame (1701_4) exists in a time section t4, and the fifth frame (1701_5) exists in a time section t5.

At this time, the time section t1, the time section t2, the time section t3, the time section t4, and the time section t5 may be fixed time sections, or may be set as necessary. For example, the time sections may be set in accordance with the number of terminals that the base station communicates with, positions of the terminals, or the like.

In FIG. 18, the first frame (1701_1), the second frame (1701_2), the third frame (1701_3), the fourth frame (1701_4), and the fifth frame (1701_5) are discretely arranged. Order in which the first frame (1701_1), the second frame (1701_2), the third frame (1701_3), the fourth frame (1701_4), and the fifth frame (1701_5) are transmitted is not limited to that illustrated in FIG. 18 and may be changed as necessary.

In FIG. 18, a multicarrier transmission method such as OFDM, for example, may be used. A single-carrier transmission method may be used, instead. A plurality of symbols, therefore, may exist along the frequency axis.

In FIGS. 17 and 18, in addition to the "frames", symbols may exist such as "control information symbols (symbols necessary to demodulate and decode data symbols)" and "pilot symbols, reference symbols, preambles for estimating variation in transmission paths, detecting signals, performing frequency synchronization, performing time synchronization, and estimating frequency offsets". Other symbols may also be included. Information transmitted using the control information symbols includes, for example, "information regarding a modulation method used to generate data symbols, information regarding a block length (code length) and code rate of error correction codes, a bit length of data symbols, and information necessary for a terminal to link to a base station".

Since the base station transmits transmission beams using the frame configuration illustrated in FIG. 17 or 18, that is, since the base station transmits a plurality of transmission beams in the same period of time at the same frequency, an effect of improving data transmission efficiency can be produced. In addition, an effect of expanding a limit of communication between the base station and terminals can be produced under a condition that "the sum of average transmission power of the base station is determined to be a certain value regardless of the number of transmission beams (or the number of modulated signals to be transmitted)".

The frame configurations employed by the base station illustrated in FIGS. 17 and 18 are just examples.

It is assumed, for example, that there are $\lambda$ or more frames ($\lambda$ is an integer equal to or larger than 2), i is an integer equal to or larger than 1 but equal to or smaller than $\lambda$, and j is an integer equal to or larger than 1 but equal to or smaller than $\lambda$. An i-th frame is a "frame used by the base station to transmit up to hi transmission beams (or modulated signals)", and a j-th frame is a "frame used by the base station to transmit up to hj transmission beams (or modulated signals)". In this case, it is sufficient that i and j that satisfy i≠j and hi≠hj exist in the frame configuration.

Alternatively, it is assumed that there are $\lambda$ or more frames ($\lambda$ is an integer equal to or larger than 2), i is an integer equal to or larger than 1 but equal to or smaller than $\lambda$, and j is an integer equal to or larger than 1 but equal to or smaller than $\lambda$. The i-th frame is a "frame used by the base station to transmit up to hi transmission beams (or modulated signals)", and the j-th frame is a "frame used by the base station to transmit up to hj transmission beams (or modulated signals)". In this case, it is sufficient that all combinations of i and j that satisfy i≠j satisfy "hi≠hj" in the frame configuration.

FIG. 19A is a diagram illustrating an example of transmission beams included in each of the frames (the first to fifth frames 1701_1 to 1701_5). FIG. 19B is a diagram illustrating an example of streams included in each of the frames (the first to fifth frames 1701_1 to 1701_5).

FIG. 19A illustrates the configuration of the transmission beams of the i-th frame illustrated in FIGS. 17 and 18. A horizontal axis in FIG. 19A(1) represents time, and there are symbols 1901_1 of a first transmission beam of the i-th frame. A horizontal axis in FIG. 19A(2) represents time, and there are symbols 1901_2 of a second transmission beam of the i-th frame. Similarly, a horizontal axis in FIG. 19A(ui) represents time, and there are symbols 1901_ui of an ui-th transmission beam of the i-th frame.

In the case of the first frame 1701_1 illustrated in FIGS. 17 and 18, u1 is an integer equal to or larger than 0 but equal to or smaller than 16. If u1 is equal to or larger than 1, there are symbols of the first to u1-th transmission beams. If u1 is 0, there is no transmission beam. Similarly, in the case of the second frame 1701_2 illustrated in FIGS. 17 and 18, u2 is an integer equal to or larger than 0 but equal to or smaller than 8. If u2 is equal to or larger than 1, there are symbols of the first to u2-th transmission beams. If u2 is 0, there is no transmission beam. In the case of the third frame 1701_3 illustrated in FIGS. 17 and 18, u3 is an integer equal to or larger than 0 but equal to or smaller than 4. If u3 is equal to or larger than 1, there are symbols of the first to u3-th transmission beams. If u3 is 0, there is no transmission beam. In the case of the fourth frame 1701_4 illustrated in FIGS. 17 and 18, u4 is an integer equal to or larger than 0 but equal to or smaller than 2. If u4 is equal to or larger than 1, there are symbols of the first to u4-th transmission beams. If u4 is 0, there is no transmission beam. In the case of the fifth frame 1701_5 illustrated in FIGS. 17 and 18, u5 is an integer equal to or larger than 0 but equal to or smaller than 1. If u5 is 1, there are symbols of the first transmission beam. If u5 is 0, there is no transmission beam.

In FIG. 19A, the symbols 1901_1 of the first transmission beam of the i-th frame, the symbols 1901_2 of the second transmission beam of the i-th frame, . . . , and the symbols 1901_ui of the ui-th transmission beam of the i-th frame exist in the time section T4 and are transmitted from the base station using the same frequency.

The frames according to the present embodiment may include subframes for assigning the symbols of the above-described transmission beams (or modulated signals). Alternatively, the frames do not include subframes. Next, the configuration of subframes of a frame will be described.

FIG. 20 is a diagram illustrating a first example of the configuration of subframes of the i-th frame. The i-th frame illustrated in FIG. 20 is the i-th frame described with reference to FIGS. 17 and 18.

In FIG. 20, a horizontal axis represents time. The i-th frame includes a first subframe (2001_1) of the i-th frame, a second subframe (2001_2) of the i-th frame, . . . , and a vi-th subframe (2001_vi) of the i-th frame. That is, the i-th frame includes vi subframes. FIG. 20 illustrates an example in which the subframes are subjected to TDM. In addition, vi is an integer equal to or larger than 1. A value of vi is set for each value of i. The value of vi may change over time.

In this case, as described above, the i-th frame is a "frame used by the base station to transmit up to hi transmission beams (or modulated signals)". In FIG. 20, the number of transmission beams (or modulated signals) may be set for each of the subframes of the i-th frame. The number of transmission beams (or modulated signals) of each of the subframes, however, needs to be equal to or smaller than hi. If the "number of transmission beams (or modulated signals)" of a k-th subframe (k is an integer equal to or larger than 1 but equal to or smaller than vi) of the i-th frame is bk (bk is an integer equal to or larger than 0), therefore, bk is an integer equal to or larger than 0 (or equal to or larger than 1) but equal to or smaller than hi.

As described above, the i-th frame includes subframes. An example of an implementation method and advantageous effects produced thereby will be described with reference to FIG. 21.

Figure 21:
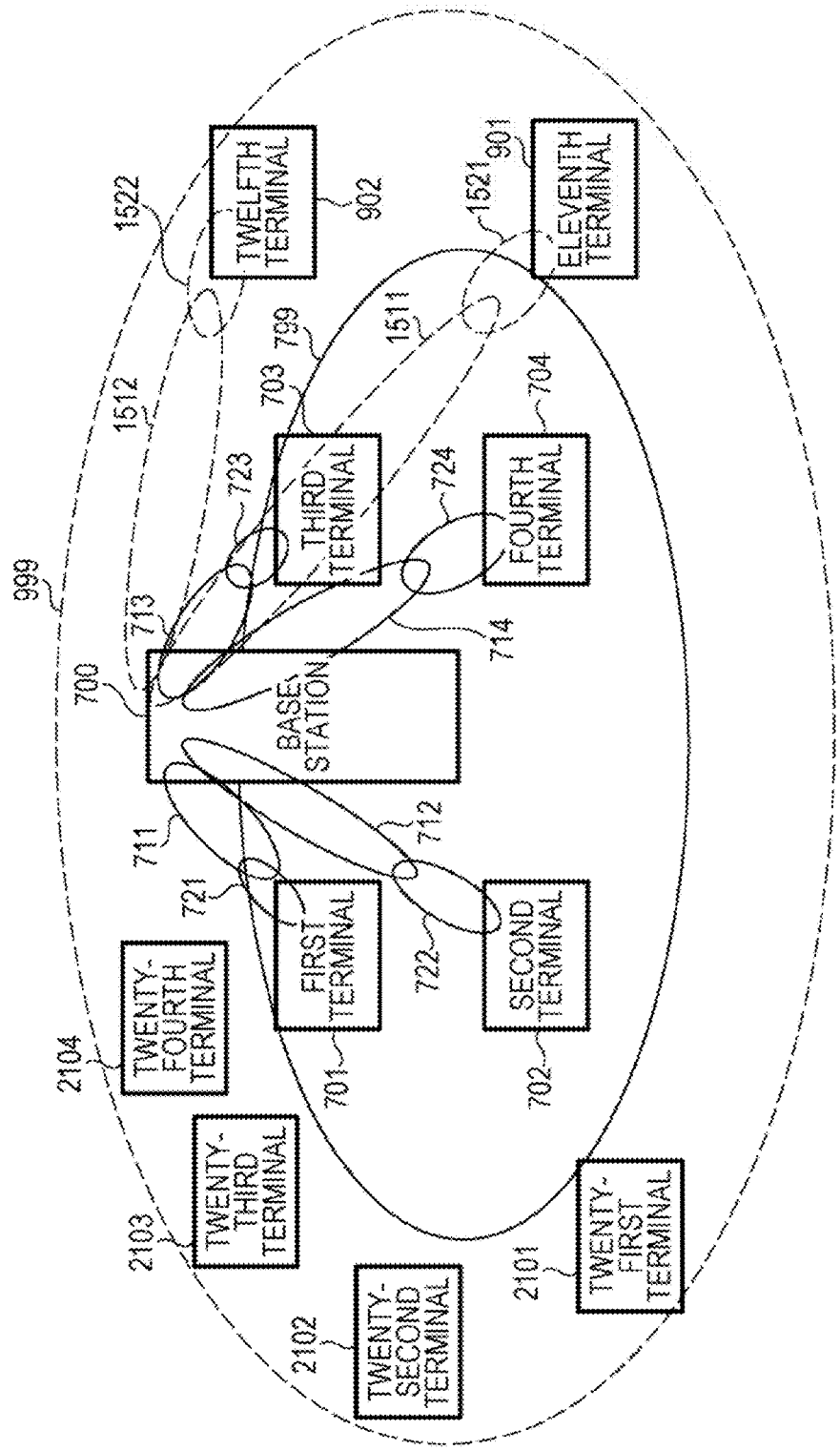
FIG. 21 is a diagram illustrating an example of a communication state of the base station and terminals according to the present embodiment.

FIG. 21 is a diagram illustrating an example of a communication state of the base station and terminals according to the present embodiment. In FIG. 21, the same components as those illustrated in FIG. 7, 9, or 15 are given the same reference numerals, and description thereof is omitted. FIG. 21 is different from FIG. 15 in that there are a twenty-first terminal (2101), a twenty-second terminal (2102), a twenty-third terminal (2103), and a twenty-fourth terminal (2104) outside the ellipse 799 indicating the "limit of the communicable range of the terminals when the base station transmits four transmission beams (or modulated signals)" but inside the ellipse 999 indicating the "limit of the communicable range of the terminals when the base station transmits two transmission beams (or modulated signals)".

In FIG. 21, because of a relationship between the number of transmission beams (or modulated signals) and the limit of the communicable range, for example, it is difficult for the base station 700 to communicate with the eleventh terminal (901), the twelfth terminal (902), the twenty-first terminal (2101), the twenty-second terminal (2102), the twenty-third terminal (2103), and the twenty-fourth terminal (2104) using six transmission beams (or modulated signals).

That is, unless the i-th frame is divided into subframes, it is difficult for the twenty-first terminal (2101), the twenty-second terminal (2102), the twenty-third terminal (2103), and the twenty-fourth terminal (2104) to communicate with the base station 700 before the eleventh terminal (901) and the twelfth terminal (902) finish the communication with the base station 700.

If the i-th frame is divided into subframes, that is, for example, if the i-th frame is divided into three subframes (a "subframe 1", a "subframe 2", and a "subframe 3"), on the other hand, the base station 700 communicates with the eleventh terminal (901) using a first transmission beam of the "subframe 1", the twelfth terminal (902) using a second transmission beam of the "subframe 1", the twenty-first terminal (2101) using a first transmission beam of the "subframe 2", the twenty-second terminal (2102) using a second transmission beam of the "subframe 2", the twenty-third terminal (2103) using a first transmission beam of the "subframe 3", and the twenty-fourth terminal (2104) using a second transmission beam of the "subframe 3". As a result, the base station 700 can communicate with the eleventh terminal (901), the twelfth terminal (902), the twenty-first terminal (2101), the twenty-second terminal (2102), the twenty-third terminal (2103), and the twenty-fourth terminal (2104).

A method for assigning the terminals to the transmission beams of the subframes of the i-th frame is not limited to that described above.

In the state illustrated in FIG. 21, for example, a plurality of subframes and a plurality of transmission beams may be assigned to a "certain terminal" as described hereinafter.

For example, the base station 700 communicates with the eleventh terminal (901) using the first transmission beam of the "subframe 1", the twelfth terminal (902) using the second transmission beam of the "subframe 1", the eleventh terminal (901) using the first transmission beam of the "subframe 2", the twenty-second terminal (2102) using the second transmission beam of the "subframe 2", the twenty-third terminal (2103) using the first transmission beam of the "subframe 3", the twenty-fourth terminal (2104) using the second transmission beam of the "subframe 3", and the twenty-first terminal (2101) using a first transmission beam of a "subframe 4". That is, in this case, a plurality of subframes are assigned to the eleventh terminal (901).

Alternatively, for example, the base station 700 communicates with the eleventh terminal (901) using the first transmission beam of the "subframe 1", the twelfth terminal (902) using the second transmission beam of the "subframe 1", the eleventh terminal (901) using the first transmission beam of the "subframe 2", the twenty-second terminal (2102) using the second transmission beam of the "subframe 2", the twenty-third terminal (2103) using the first transmission beam of the "subframe 3", the twenty-fourth terminal (2104) using the second transmission beam of the "subframe 3", the twenty-first terminal (2101) using the first transmission beam of the "subframe 4", and the twenty first terminal (2101) using a second transmission beam of the "subframe 4". That is, in this case, a plurality of subframes are assigned to the eleventh terminal (901), and a plurality of transmission beams are assigned to the twenty-first terminal (2101).

Alternatively, for example, the base station 700 communicates with the eleventh terminal (901) using the first transmission beam of the "subframe 1", the twelfth terminal (902) using the second transmission beam of the "subframe 1", the eleventh terminal (901) using the first transmission beam of the "subframe 2", the twenty-second terminal (2102) using the second transmission beam of the "subframe 2", the twenty-third terminal (2103) using the first transmission beam of the "subframe 3", the twenty-fourth terminal (2104) using the second transmission beam of the "subframe 3", the twenty-first terminal (2101) using the first transmission beam of the "subframe 4", the twenty-first terminal (2101) using the second transmission beam of the "subframe 4", and the twenty-first terminal (2101) using a first transmission beam of a "subframe 5". That is, in this case, a plurality of subframes are assigned to the eleventh terminal (901), and a plurality of subframes and a plurality of transmission beams are assigned to the twenty-first terminal (2101).

Figure 22:
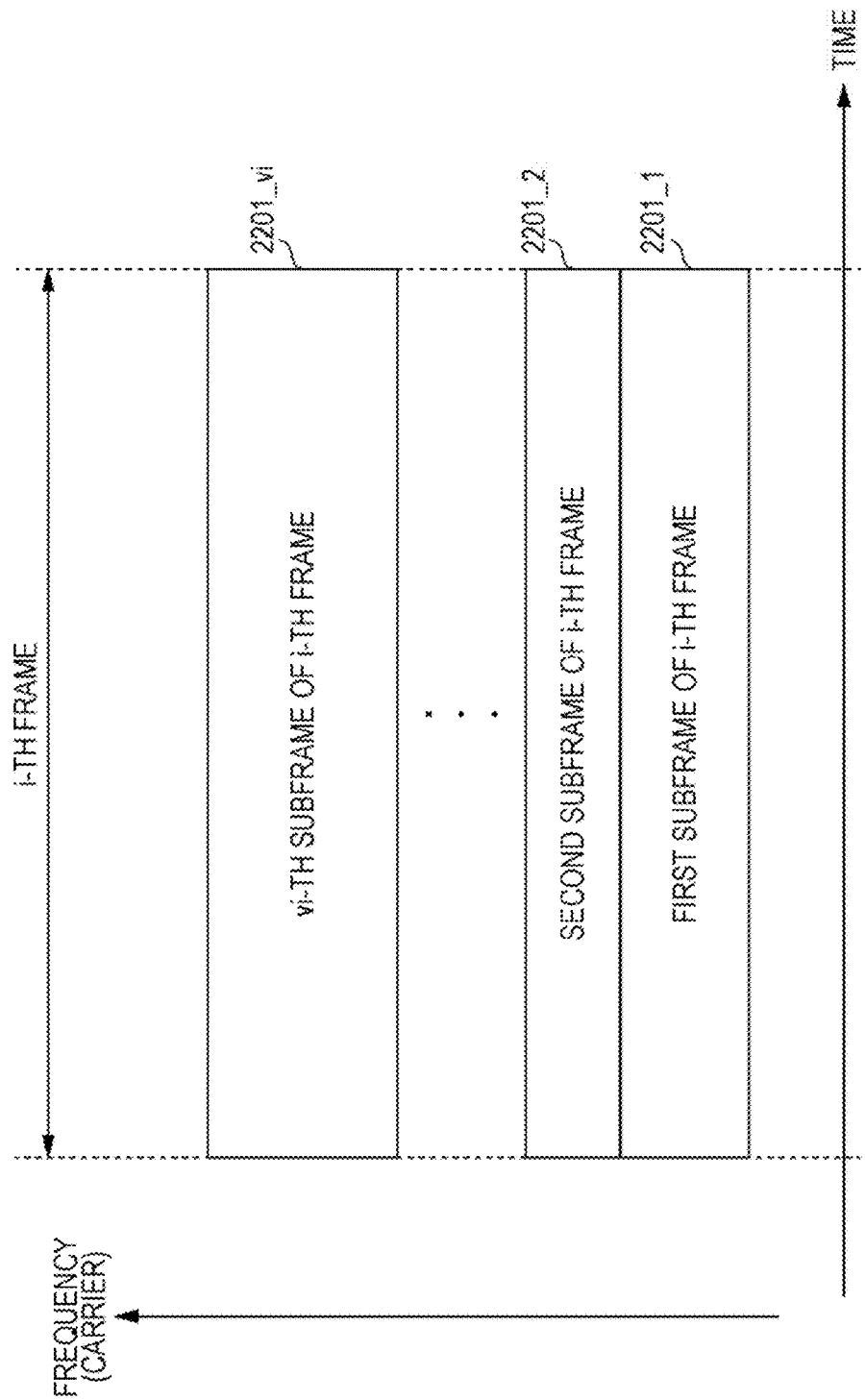
FIG. 22 is a diagram illustrating a second example of the configuration of the subframes included in the i-th frame.

FIG. 22 is a diagram illustrating a second example of the configuration of the subframes of the i-th frame. The i-th frame illustrated in FIG. 22 is the i-th frame described with reference to FIGS. 17 and 18.

FIG. 19B will be described as an assumption. FIG. 19B is a diagram illustrating an example of streams included in each of the frames (the first to fifth frames 1701_1 to 1701_5) illustrated in FIGS. 17 and 18.

FIG. 19B illustrates the configuration of the streams of the i-th frame illustrated in FIGS. 17 and 18. A horizontal axis in FIG. 19B(1) represents time, and there are symbols 1901B_1 of a first stream of the i-th frame. A horizontal axis in FIG. 19B(2) represents time, and there are symbols 1901B_2 of a second stream of the i-th frame. Similarly, a horizontal axis in FIG. 19B(ui) represents time, and there are symbols 1901B_ui of an ui-th stream of the i-th frame.

In the case of the first frame 1701_1 illustrated in FIGS. 17 and 18, u1 is an integer equal to or larger than 0 but equal to or smaller than 16. If u1 is equal to or larger than 1, there are symbols of the first to u1-th streams. If u1 is 0, there is no stream. Similarly, in the case of the second frame 1701_2 illustrated in FIGS. 17 and 18, u2 is an integer equal to or larger than 0 but equal to or smaller than 8. If u2 is equal to or larger than 1, there are symbols of the first to u2-th streams. If u2 is 0, there is no stream. In the case of the third frame 1701_3 illustrated in FIGS. 17 and 18, u3 is an integer equal to or larger than 0 but equal to or smaller than 4. If u3 is equal to or larger than 1, there are symbols of the first to u3-th streams. If u3 is 0, there is no stream. In the case of the fourth frame 1701_4 illustrated in FIGS. 17 and 18, u4 is an integer equal to or larger than 0 but equal to or smaller than 2. If u4 is equal to or larger than 1, there are symbols of the first to u4-th streams. If u4 is 0, there is no stream. In the case of the fifth frame 1701_5 illustrated in FIGS. 17 and 18, u5 is an integer equal to or larger than 0 but equal to or smaller than 1. If u5 is 1, there are symbols of the first stream. If u5 is 0, there is no stream.

In FIG. 19B, the symbols 1901B_1 of the first stream of the i-th frame, the symbols 1901B_2 of the second stream of the i-th frame, . . . , and the symbols 1901B_ui of the ui-th stream of the i-th frame exist in the time section T4 and are transmitted from the base station using the same frequency.

In FIG. 22, a horizontal axis represents time, and a vertical axis represents frequency (carrier or subcarrier). In FIG. 22, it is assumed, for example, that multicarrier transmission such as OFDM is employed, and symbols exist in a frequency direction.

As illustrated in FIG. 22, the i-th frame includes a first subframe (2201_1) of the i-th frame, a second subframe (2201_2) of the i-th frame, . . . , and a vi-th subframe (2201_vi) of the i-th frame. That is, the i-th frame includes vi subframes. FIG. 22 illustrates an example in which the subframes are subjected to frequency-division multiplexing (FDM). In addition, vi is an integer equal to or larger than 1. A value of vi is set for each value of i. The value of vi may change over time.

The usage of the subframes is the same as in FIGS. 20 and 21. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 22. Alternatively, a transmission beam may be generated for each stream.

Figure 23:
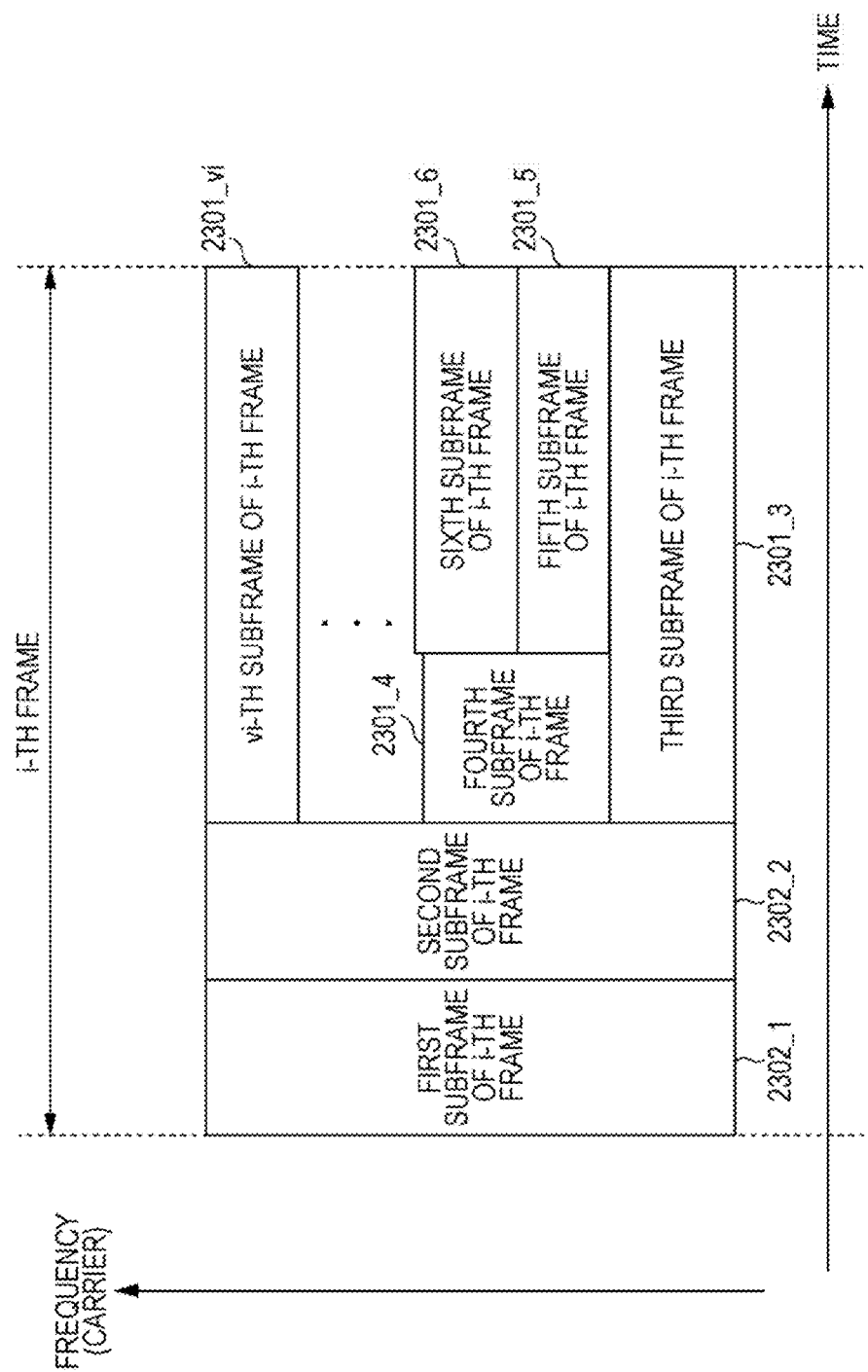
FIG. 23 is a diagram illustrating a third example of the configuration of the subframes included in the i-th frame.

FIG. 23 is a diagram illustrating a third example of the configuration of the subframes of the i-th frame. The i-th frame illustrated in FIG. 23 is the i-th frame described with reference to FIGS. 17, 18, and the like.

In FIG. 23, a horizontal axis represents time, and a vertical axis represents frequency (carrier or subcarrier). In FIG. 23, it is assumed, for example, that multicarrier transmission such as OFDM is employed, and symbols exist in the frequency direction.

As illustrated in FIG. 23, the i-th frame includes a first subframe (2301_1) of the i-th frame, a second subframe (2301_2) of the i-th frame, a third subframe (2301_3) of the i-th frame, a fourth subframe (2301_4) of the i-th frame, a fifth subframe (2301_5) of the i-th frame, a sixth subframe of the i-th frame (2301_6), . . . , and a vi-th subframe (2301_vi) of the i-th frame. That is, the i-th frame includes vi subframes. In the example illustrated in FIG. 23, the first subframe of the i-th frame and the second subframe of the i-th frame are subjected to TDM, and the other subframes are subjected to division multiplexing using a domain configured by frequency and time. In addition, vi is an integer equal to or larger than 1. A value of vi is set for each value of i. The value of vi may change over time.

The usage of the subframes is the same as described with reference to FIG. 22. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 23. Alternatively, a transmission beam may be generated for each stream.

Figure 24:
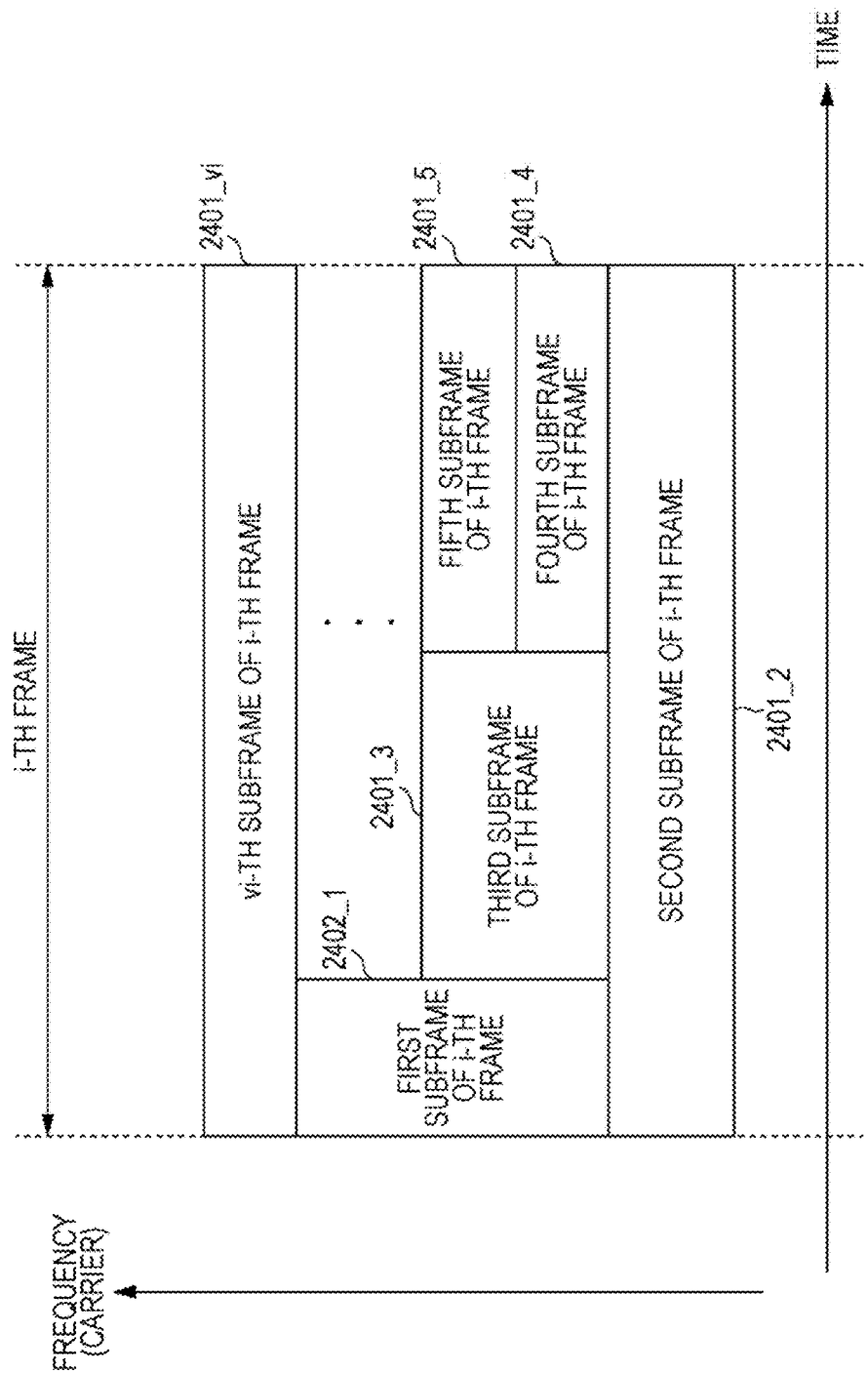
FIG. 24 is a diagram illustrating a fourth example of the configuration of the subframes included in the i-th frame.

FIG. 24 is a diagram illustrating a fourth example of the configuration of the subframes of the i-th frame. The i-th frame illustrated in FIG. 24 is the i-th frame described with reference to FIGS. 17, 18, and the like.

In FIG. 24, a horizontal axis represents time, and a vertical axis represents frequency (carrier or subcarrier). In FIG. 24, it is assumed, for example, that multicarrier transmission such as OFDM is employed, and symbols exist in the frequency direction.

As illustrated in FIG. 24, the i-th frame includes a first subframe (2401_1) of the i-th frame, a second subframe (2401_2) of the i-th frame, a third subframe (2401_3) of the i-th frame, a fourth subframe (2401_4) of the i-th frame, a fifth subframe (2401_5) of the i-th frame, . . . , and a vi-th subframe (2401_vi) of the i-th frame. That is, the i-th frame includes vi subframes. In the example illustrated in FIG. 24, the second subframe of the i-th frame and the vi-th subframe of the i-th frame are subjected to FDM, and the other subframes are subjected to division multiplexing using a domain configured by frequency and time. In addition, vi is an integer equal to or larger than 1. A value of vi is set for each value of i. The value of vi may change over time.

The usage of the subframes is the same as described with reference to FIG. 22. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 22. Alternatively, a transmission beam may be generated for each stream.

Figure 25:
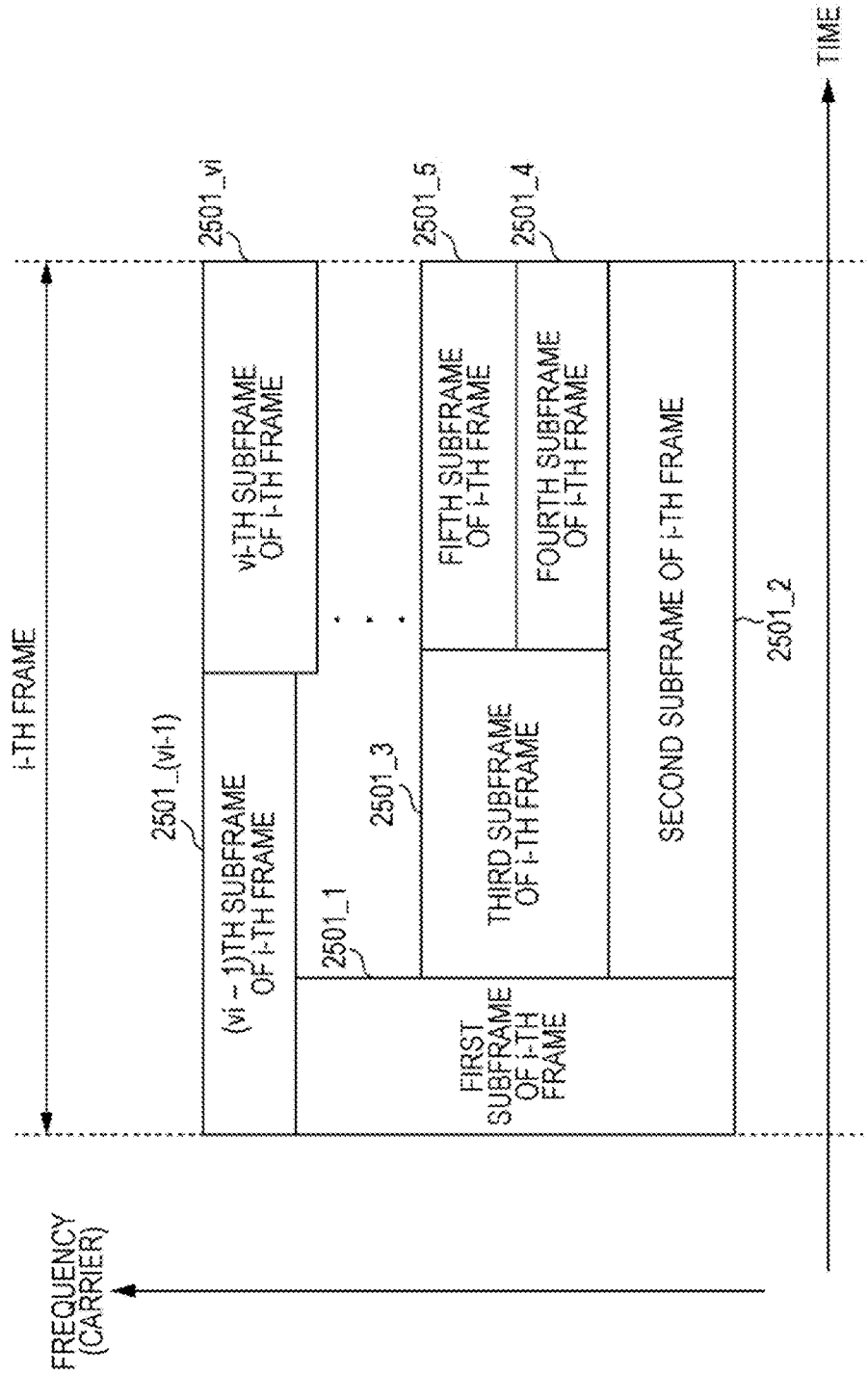
FIG. 25 is a diagram illustrating a fifth example of the configuration of the subframes included in the i-th frame.

FIG. 25 is a diagram illustrating a fifth example of the configuration of the subframes of the i-th frame. The i-th frame illustrated in FIG. 25 is the i-th frame described with reference to FIGS. 17, 18, and the like.

In FIG. 25, a horizontal axis represents time, and a vertical axis represents frequency (carrier or subcarrier). In FIG. 25, it is assumed, for example, that multicarrier transmission such as OFDM is employed, and symbols exist in the frequency direction.

As illustrated in FIG. 25, the i-th frame includes a first subframe (2501_1) of the i-th frame, a second subframe (2501_2) of the i-th frame, a third subframe (2501_3) of the i-th frame, a fourth subframe (2501_4) of the i-th frame, a fifth subframe (2501_5) of the i-th frame, . . . , a (vi−1)th subframe (2501_(vi−1)) of the i-th frame, and a vi-th subframe (2501_vi) of the i-th frame. That is, the i-th frame includes vi subframes. In the example illustrated in FIG. 25, the subframes are subjected to division multiplexing using a domain configured by frequency and time. In addition, vi is an integer equal to or larger than 1. A value of vi is set for each value of i. The value of vi may change over time.

The usage of the subframes is the same as described with reference to FIG. 22. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 25. Alternatively, a transmission beam may be generated for each stream.

The configuration of each of the frames illustrated in FIGS. 17 and 18 subjected to time division has been described above. Next, frames subjected to frequency division will be described.

Figure 26:
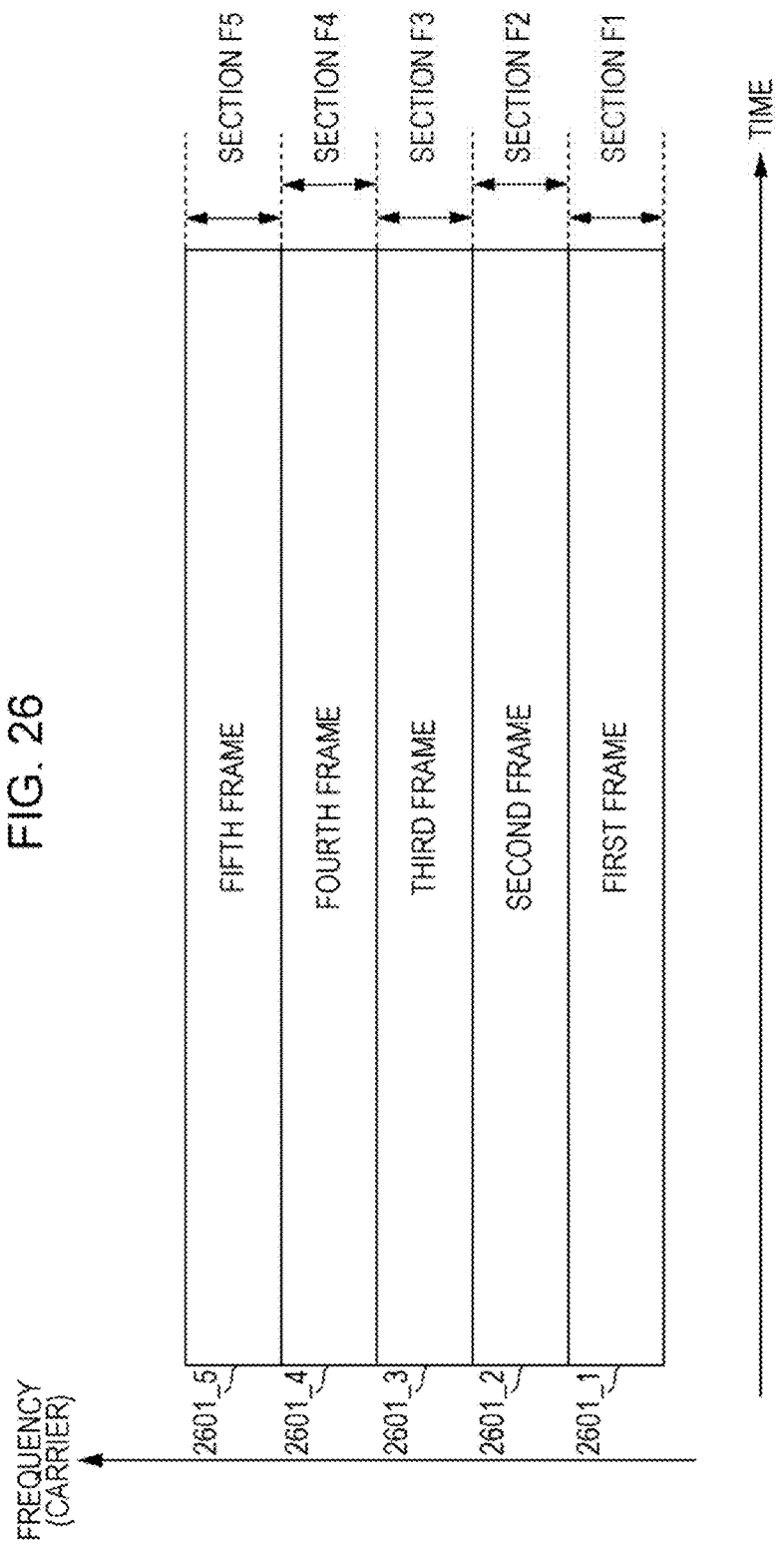
FIG. 26 is a diagram illustrating an example of the "frame configuration of one or more streams (or modulated signals)" transmitted from a base station.

FIG. 26 is a diagram illustrating an example of the "frame configuration of one or more streams (or modulated signals)" transmitted from a base station. The example illustrated in FIG. 26 is an example in which the limits of the five communicable ranges illustrated in FIG. 16 have been set.

In FIG. 26, a horizontal axis represents time, and a vertical axis represents frequency (carrier). There are first to fifth frames 2601_1 to 2601_5, respectively. It is assumed that the first frame (2601_1), the second frame (2601_2), the third frame (2601_3), the fourth frame (2601_4), and the fifth frame (2601_5) are subjected to FDM. That is, these frames are based on multicarrier transmission such as OFDM.

At this time, the first frame (2601_1) is a "frame used by the base station to transmit up to sixteen streams (or modulated signals)". This frame is used to achieve the communicable area corresponding to the area inside the ellipse 1651 illustrated in FIG. 16.

The second frame (2601_2) is a "frame used by the base station to transmit up to eight streams (or modulated signals)". This frame is used to achieve the communicable area corresponding to the area inside the ellipse 1652 illustrated in FIG. 16.

The second frame (2601_3) is a "frame used by the base station to transmit up to four streams (or modulated signals)". This frame is used to achieve the communicable area corresponding to the area inside the ellipse 1653 illustrated in FIG. 16.

The fourth frame (2601_4) is a "frame used by the base station to transmit up to two streams (or modulated signals)". This frame is used to achieve the communicable area corresponding to the area inside the ellipse 1654 illustrated in FIG. 16.

The second frame (2601_5) is a "frame used by the base station to transmit one stream (or modulated signal)". This frame is used to achieve the communicable area corresponding to the area inside the ellipse 1655 illustrated in FIG. 16.

The first frame (2601_1) exists in a frequency section F1, the second frame (2601_2) exists in a frequency section F2, the third frame (2601_3) exists in a frequency section F3, the fourth frame (2601_4) exists in a frequency section F4, and the fifth frame (2601_5) exists in a frequency section F5.

At this time, the frequency section F1, the frequency section F2, the frequency section F3, the frequency section F4, and the frequency section F5 may be fixed frequency sections, or may be set as necessary. For example, the frequency sections may be set in accordance with the number of terminals that the base station communicates with, positions of the terminals, or the like.

Order in which the first frame (2601_1), the second frame (2601_2), the third frame (2601_3), the fourth frame (2601_4), and the fifth frame (2601_5) are arranged along the frequency axis is not limited to that illustrated in FIG. 26 and may be changed as necessary.

Since the base station transmits streams using the frame configuration illustrated in FIG. 26, that is, since the base station transmits a plurality of streams in the same period of time at the same frequency, an effect of improving data transmission efficiency can be produced. In addition, an effect of expanding a limit of communication between the base station and terminals can be produced under a condition that "the sum of average transmission power of the base station is determined to be a certain value regardless of the number of streams (or the number of modulated signals to be transmitted)".

The frame configuration employed by the base station illustrated in FIG. 26 is just an example.

It is assumed, for example, that there are $\lambda$ or more frames ($\lambda$ is an integer equal to or larger than 2), i is an integer equal to or larger than 1 but equal to or smaller than $\lambda$, and j is an integer equal to or larger than 1 but equal to or smaller than $\lambda$. When i≠j, the i-th frame is a "frame used by the base station to transmit up to hi streams (or modulated signals)", and the j-th frame is a "frame used by the base station to transmit up to hj streams (or modulated signals)". In this case, it is sufficient that i and j that satisfy i≠j and hi≠hj exist in the frame configuration.

Alternatively, it is assumed that there are $\lambda$ or more frames ($\lambda$ is an integer equal to or larger than 2), i is an integer equal to or larger than 1 but equal to or smaller than $\lambda$, and j is an integer equal to or larger than 1 but equal to or smaller than $\lambda$. The i-th frame is a "frame used by the base station to transmit up to hi streams (or modulated signals)", and the j-th frame is a "frame used by the base station to transmit up to hj streams (or modulated signals)". In this case, it is sufficient that all combinations of i and j that satisfy i≠j satisfy "hi≠hj" in the frame configuration.

Next, the example of the streams of the frames illustrated in FIG. 26 will be described with reference to FIG. 19B.

FIG. 19B illustrates an example of the streams included in each of the frames illustrated in FIG. 26 (the first to fifth frames 2601_1 to 2601_5). It is assumed that data can be transmitted using each stream. It is assumed, for example, that if there are a first stream and a second stream, a first piece of data can be transmitted using the first stream and a second piece of data can be transmitted using the second stream.

FIG. 19B illustrates the configuration of streams of the i-th frame illustrated in FIG. 26. The horizontal axis in FIG. 19B(1) represents time, and there are the symbols 1901B_1 of the first stream of the i-th frame. The horizontal axis in FIG. 19B(2) represents time, and there are the symbols 1901B_2 of the second stream of the i-th frame. Similarly, the horizontal axis in FIG. 19B(ui) represents time, and there are the symbols 1901B_ui of the ui-th stream of the i-th frame.

In the case of the first frame 2601 illustrated in FIG. 26, u1 is an integer equal to or larger than 0 but equal to or smaller than 16. If u1 is equal to or larger than 1, there are symbols of the first to u1-th streams. If u1 is 0, there is no stream. Similarly, in the case of the second frame 2602 illustrated in FIG. 26, u2 is an integer equal to or larger than 0 but equal to or smaller than 8. If u2 is equal to or larger than 1, there are symbols of the first to u2-th streams. If u2 is 0, there is no stream. In the case of the third frame 2603 illustrated in FIG. 26, u3 is an integer equal to or larger than 0 but equal to or smaller than 4. If u3 is equal to or larger than 1, there are symbols of the first to u3-th streams. If u3 is 0, there is no stream. In the case of the fourth frame 2604 illustrated in FIG. 26, u4 is an integer equal to or larger than 0 but equal to or smaller than 2. If u4 is equal to or larger than 1, there are symbols of the first to u4-th streams. If u4 is 0, there is no stream. In the case of the fifth frame 2605 illustrated in FIG. 26, u5 is an integer equal to or larger than 0 but equal to or smaller than 1. If u5 is equal to or larger than 1, there are symbols of the first to u5-th streams. If u5 is 0, there is no stream.

In FIG. 19B, the symbols 1901B_1 of the first stream of the i-th frame, the symbols 1901B_2 of the second stream of the i-th frame, . . . , and the symbols 1901B_ui of the ui-th stream of the i-th frame exist in the time section T4 and are transmitted from the base station using the same frequency.

Next, the configuration of subframes of the frames illustrated in FIG. 26 will be described with reference to FIG. 20. FIG. 20 illustrates an example of the subframes of the i-th frame described with reference to FIG. 26 and the like.

In FIG. 20, the horizontal axis represents time. The i-th frame includes the first subframe (2001_1) of the i-th frame, the second subframe (2001_2) of the i-th frame, . . . , and the vi-th subframe (2001_vi) of the i-th frame. That is, the i-th frame includes the vi subframes. FIG. 20 illustrates an example in which the subframes are subjected to TDM. In addition, vi is an integer equal to or larger than 1. The value of vi is set for each value of i. The value of vi may change over time.

In this case, as described above, the i-th frame is a "frame used by the base station to transmit up to hi streams (or modulated signals)". In FIG. 20, the number of streams (or modulated signals) may be set for each of the subframes of the i-th frame. The number of streams (or modulated signals) of each of the subframes, however, needs to be equal to or smaller than hi. If the "number of streams (or modulated signals)" of the k-th subframe (k is an integer equal to or larger than 1 but equal to or smaller than vi) of the i-th frame is bk (bk is an integer equal to or larger than 0), therefore, bk is an integer equal to or larger than 0 (or equal to or larger than 1) but equal to or smaller than hi.

As described above, the i-th frame includes subframes. An example of an implementation method and advantageous effects produced thereby will be described with reference to FIG. 21.

FIG. 21 is a diagram illustrating an example of the communication state of the base station and the terminals according to the present embodiment. In FIG. 21, the same components as those illustrated in FIG. 7, 9, or 15 are given the same reference numerals, and description thereof is omitted. FIG. 21 is different from FIG. 15 in that there are the twenty-first terminal (2101), the twenty-second terminal (2102), the twenty-third terminal (2103), and the twenty-fourth terminal (2104) outside the ellipse 799 indicating the "limit of the communicable range of the terminals when the base station transmits four streams (or modulated signals)" but inside the ellipse 999 indicating the "limit of the communicable range of the terminals when the base station transmits two streams (or modulated signals)".

In FIG. 21, because of a relationship between the number of streams (or modulated signals) and the limit of the communicable range, for example, it is difficult for the base station 700 to communicate with the eleventh terminal (901), the twelfth terminal (902), the twenty-first terminal (2101), the twenty-second terminal (2102), the twenty-third terminal (2103), and the twenty-fourth terminal (2104) using six streams (or modulated signals).

That is, unless the i-th frame is divided into subframes, it is difficult for the twenty-first terminal (2101), the twenty-second terminal (2102), the twenty-third terminal (2103), and the twenty-fourth terminal (2104) to communicate with the base station 700 before the eleventh terminal (901) and the twelfth terminal (902) finish the communication with the base station 700.

If the i-th frame is divided into subframes, that is, for example, if the i-th frame is divided into the three subframes (the "subframe 1", the "subframe 2", and the "subframe 3"), on the other hand, the base station 700 communicates with the eleventh terminal (901) using a first stream of the "subframe 1", the twelfth terminal (902) using a second stream of the "subframe 1", the twenty-first terminal (2101) using a first stream of the "subframe 2", the twenty-second terminal (2102) using a second stream of the "subframe 2", the twenty-third terminal (2103) using a first stream of the "subframe 3", and the twenty-fourth terminal (2104) using a second stream of the "subframe 3". As a result, the base station 700 can communicate with the eleventh terminal (901), the twelfth terminal (902), the twenty-first terminal (2101), the twenty-second terminal (2102), the twenty-third terminal (2103), and the twenty-fourth terminal (2104).

A method for assigning the terminals to the streams of the subframes of the i-th frame is not limited to that described above.

In the state illustrated in FIG. 21, for example, a plurality of subframes and a plurality of streams may be assigned to a "certain terminal" as described hereinafter.

For example, the base station 700 communicates with the eleventh terminal (901) using the first stream of the "subframe 1", the twelfth terminal (902) using the second stream of the "subframe 1", the eleventh terminal (901) using the first stream of the "subframe 2", the twenty-second terminal (2102) using the second stream of the "subframe 2", the twenty-third terminal (2103) using the first stream of the "subframe 3", the twenty-fourth terminal (2104) using the second stream of the "subframe 3", and the twenty-first terminal (2101) using a first stream of a "subframe 4". That is, in this case, a plurality of subframes are assigned to the eleventh terminal (901).

Alternatively, for example, the base station 700 communicates with the eleventh terminal (901) using the first stream of the "subframe 1", the twelfth terminal (902) using the second stream of the "subframe 1", the eleventh terminal (901) using the first stream of the "subframe 2", the twenty-second terminal (2102) using the second stream of the "subframe 2", the twenty-third terminal (2103) using the first stream of the "subframe 3", the twenty-fourth terminal (2104) using the second stream of the "subframe 3", the twenty-first terminal (2101) using the first stream of the "subframe 4", and the twenty-first terminal (2101) using a second stream of the "subframe 4". That is, in this case, a plurality of subframes are assigned to the eleventh terminal (901), and a plurality of streams are assigned to the twenty-first terminal (2101).

Alternatively, for example, the base station 700 communicates with the eleventh terminal (901) using the first stream of the "subframe 1", the twelfth terminal (902) using the second stream of the "subframe 1", the eleventh terminal (901) using the first stream of the "subframe 2", the twenty-second terminal (2102) using the second stream of the "subframe 2", the twenty-third terminal (2103) using the first stream of the "subframe 3", the twenty-fourth terminal (2104) using the second stream of the "subframe 3", the twenty-first terminal (2101) using the first stream of the "subframe 4", the twenty-first terminal (2101) using the second stream of the "subframe 4", and the twenty-first terminal (2101) using a first stream of a "subframe 5". That is, in this case, a plurality of subframes are assigned to the eleventh terminal (901), and a plurality of subframes and a plurality of streams are assigned to the twenty-first terminal (2101).

Next, the configuration of the subframes of the frames illustrated in FIG. 26 will be described with reference to FIGS. 22 to 25. FIG. 22 illustrates an example of the configuration of the i-th frame described with reference to FIG. 26 and the like different from that illustrated in FIG. 20.

In FIG. 22, the horizontal axis represents time, and the vertical axis represents frequency (carrier or subcarrier). In FIG. 22, it is assumed, for example, that multicarrier transmission such as OFDM is employed, and the symbols exist in the frequency direction.

As illustrated in FIG. 22, the i-th frame includes the first subframe (2201_1) of the i-th frame, the second subframe (2201_2) of the i-th frame, . . . , and the vi-th subframe (2201_vi) of the i-th frame. That is, the i-th frame includes the vi subframes. FIG. 22 illustrates an example in which the subframes are subjected to FDM. In addition, vi is an integer equal to or larger than 1. The value of vi is set for each value of i. The value of vi may change over time.

The usage of the subframes is the same as in FIGS. 20 and 21. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 22. Alternatively, a transmission beam may be generated for each stream.

FIG. 23 illustrates an example of the configuration of the i-th frame different from that illustrated in FIG. 20 or 22.

In FIG. 23, the horizontal axis represents time, and the vertical axis represents frequency (carrier or subcarrier). In FIG. 23, it is assumed, for example, that multicarrier transmission such as OFDM is employed, and the symbols exist in the frequency direction.

As illustrated in FIG. 23, the i-th frame includes the first subframe (2301_1) of the i-th frame, the second subframe (2301_2) of the i-th frame, the third subframe (2301_3) of the i-th frame, the fourth subframe (2301_4) of the i-th frame, the fifth subframe (2301_5) of the i-th frame, the sixth subframe of the i-th frame (2301_6), . . . , and the vi-th subframe (2301_vi) of the i-th frame. That is, the i-th frame includes the vi subframes. In the example illustrated in FIG. 23, the first subframe of the i-th frame and the second subframe of the i-th frame are subjected to TDM, and the other subframes are subjected to division multiplexing using the domain configured by frequency and time. In addition, vi is an integer equal to or larger than 1. The value of vi is set for each value of i. The value of vi may change over time.

The usage of the subframes is the same as described with reference to FIG. 22. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 23. Alternatively, a transmission beam may be generated for each stream.

FIG. 24 illustrates an example of the configuration of the i-th frame described with reference to FIG. 26 and the like different from that illustrated in FIG. 20, 22, or 23.

In FIG. 24, the horizontal axis represents time, and the vertical axis represents frequency (carrier or subcarrier). In FIG. 24, it is assumed, for example, that multicarrier transmission such as OFDM is employed, and the symbols exist in the frequency direction.

As illustrated in FIG. 24, the i-th frame includes the first subframe (2401_1) of the i-th frame, the second subframe (2401_2) of the i-th frame, the third subframe (2401_3) of the i-th frame, the fourth subframe (2401_4) of the i-th frame, the fifth subframe (2401_5) of the i-th frame, . . . , and the vi-th subframe (2401_vi) of the i-th frame. That is, the i-th frame includes the vi subframes. In the example illustrated in FIG. 24, the second subframe of the i-th frame and the vi-th subframe of the i-th frame are subjected to FDM, and the other subframes are subjected to division multiplexing using the domain configured by frequency and time. In addition, vi is an integer equal to or larger than 1. The value of vi is set for each value of i. The value of vi may change over time.

The usage of the subframes is the same as described with reference to FIG. 22. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 22. Alternatively, a transmission beam may be generated for each stream.

FIG. 25 illustrates an example of the configuration of the i-th frame described with reference to FIG. 26 and the like different from that illustrated in FIG. 20, 22, 23, or 24.

In FIG. 25, the horizontal axis represents time, and the vertical axis represents frequency (carrier or subcarrier). In FIG. 25, it is assumed, for example, that multicarrier transmission such as OFDM is employed, and the symbols exist in the frequency direction.

As illustrated in FIG. 25, the i-th frame includes the first subframe (2501_1) of the i-th frame, the second subframe (2501_2) of the i-th frame, the third subframe (2501_3) of the i-th frame, the fourth subframe (2501_4) of the i-th frame, the fifth subframe (2501_5) of the i-th frame, . . . , the (vi−1)th subframe (2501_(vi−1)) of the i-th frame, and the vi-th subframe (2501_vi) of the i-th frame. That is, the i-th frame includes the vi subframes. In the example illustrated in FIG. 25, the subframes are subjected to division multiplexing using the domain configured by frequency and time.

In addition, vi is an integer equal to or larger than 1. The value of vi is set for each value of i. The value of vi may change over time.

The usage of the subframes is the same as described with reference to FIG. 22. That is, each subframe may include one or more streams (or modulated signals), and a terminal may be assigned to each subframe or each stream. As a result, the same advantageous effects as those described with reference to FIGS. 20 and 21 can be produced.

At this time, a different type of beamforming may be performed for each subframe. That is, a transmission beam may be generated for each subframe illustrated in FIG. 25. Alternatively, a transmission beam may be generated for each stream.

As described above, by determining the number of transmission beams (the number of streams) for each frame and causing the base station to transmit a plurality of frames, the communicable range becomes different for each frame, and an effect of expanding a communication distance between the base station and terminals can be produced.

The frame configuration, the configuration of transmission beams, the configuration of streams, the configuration of subframes, the configuration of symbols, and the like described in the present embodiment are merely examples, and these configurations are not limited to those described in the present embodiment. For example, the frame configuration, the configuration of transmission beams, the configuration of streams, the configuration of subframes, the configuration of symbols, and the like described in the present embodiment include symbols such as data symbols, control information symbols including control information necessary to demodulate and decode the data symbols, and pilot symbols, reference symbols, preambles for estimating variation in transmission paths, detecting signals, performing frequency synchronization, performing time synchronization, and estimating frequency offsets. Other symbols may also be included. Information transmitted using the control information symbols includes, for example, information regarding a modulation method used to generate data symbols, information regarding a block length (code length) and code rate of error correction codes, a bit length of data symbols, and information necessary for a terminal to link to a base station.

With respect to the frames illustrated in FIGS. 17 and 26 and the subframes illustrated in FIGS. 20, 22, 23, 24, 25, and 26, time division (or TDM), frequency division (or FDM), and time and frequency domain division (or time-and-frequency-domain-division multiplexing) have been described. Next, other examples of time boundaries or frequency boundaries of frames or subframes will be described.

Figure 27:
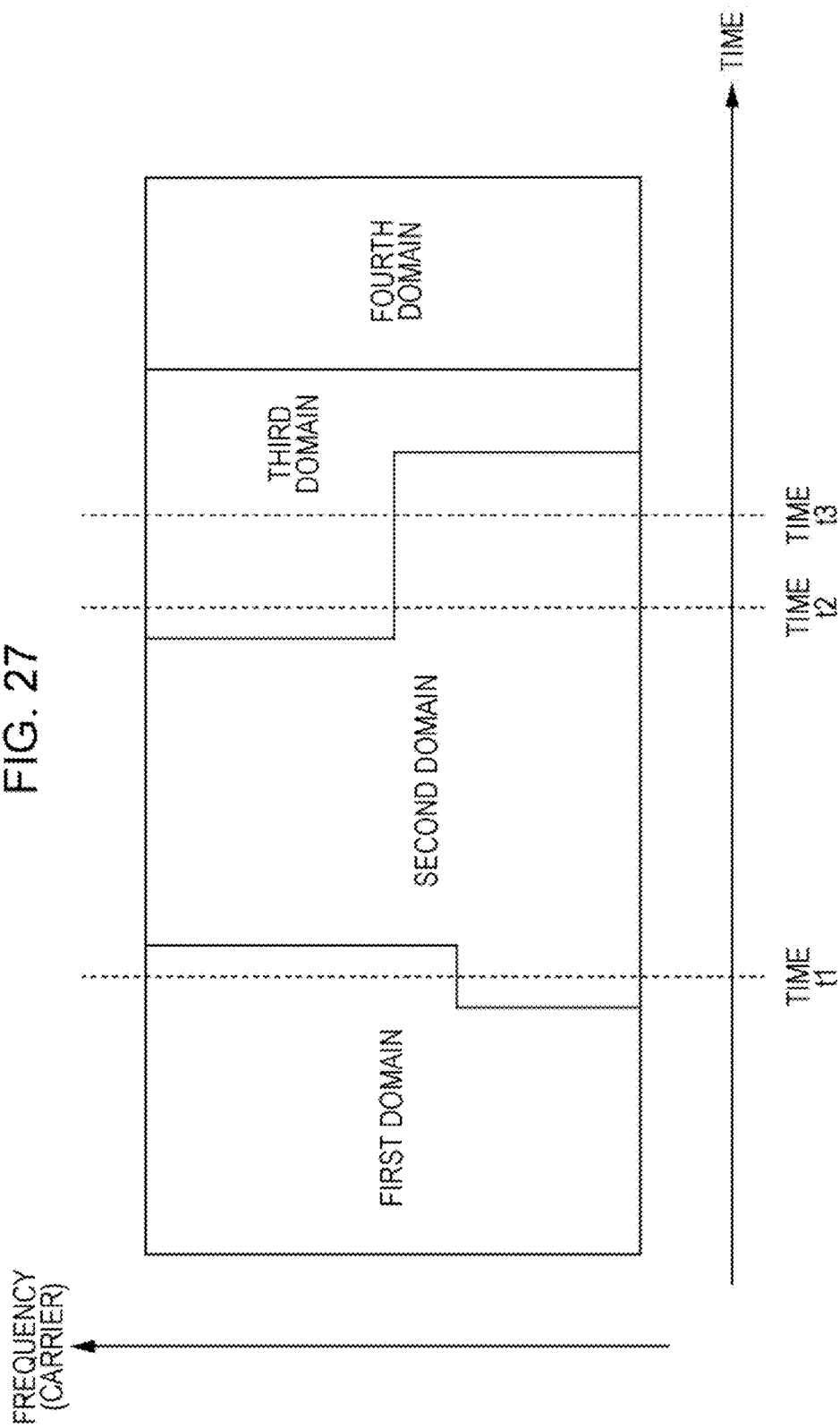
FIG. 27 is a diagram illustrating an example of division in a time direction.

In the case of division in a time direction, for example, a state illustrated in FIG. 27 is assumed. FIG. 27 is a diagram illustrating an example of the division in the time direction.

In FIG. 27, a horizontal axis represents time, and a vertical axis represents frequency (carrier). FIG. 27 illustrates an example in which a first domain, a second domain, a third domain, and a fourth domain are defined in the time direction.

As illustrated in FIG. 27, at a time t1, the first and second domains exist. At times t2 and t3, the second and third domains exist. The third and fourth domains do not overlap in the time direction. The "division in the time direction" is defined with these cases included. For example, a frame may be subjected to time division such that a plurality of frames exist at a certain time as illustrated in FIG. 27. Alternatively, a subframe may be subjected to time division such that a plurality of subframes exist at a certain time as illustrated in FIG. 27.

Furthermore, as indicated by the first to third domains illustrated in FIG. 27, a domain may have different time widths at different frequencies. That is, a domain need not be rectangular in a time-frequency plane. The "division in the time direction" is defined with these cases included.

Figure 28:
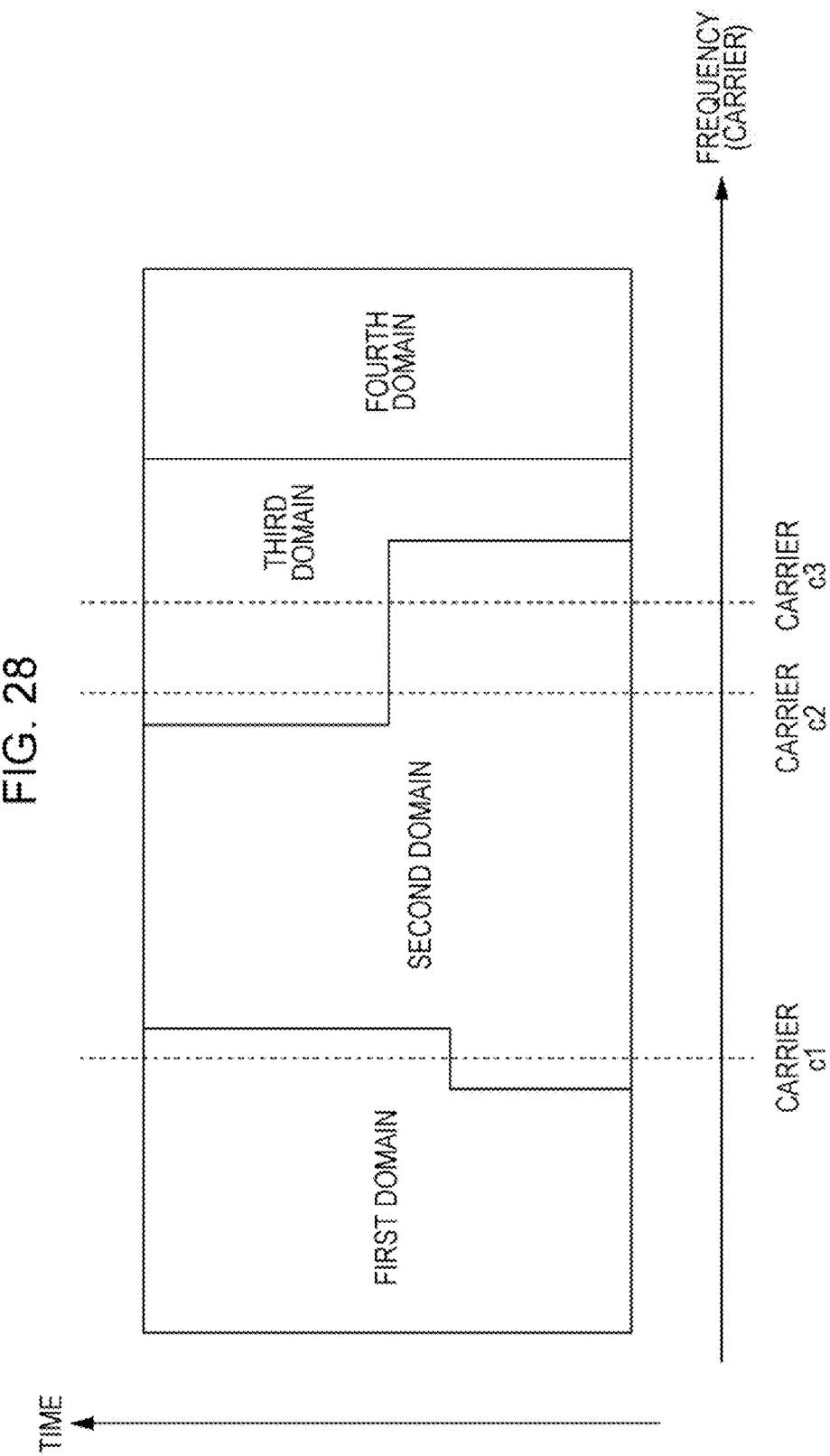
FIG. 28 is a diagram illustrating an example of division in a frequency direction.

In the case of division in the frequency direction, for example, a state illustrated in FIG. 28 is assumed. FIG. 28 is a diagram illustrating an example of the division in the frequency direction.

In FIG. 28, a horizontal axis represents frequency (carrier), and a vertical axis represents time. FIG. 28 illustrates an example in which a first domain, a second domain, a third domain, and a fourth domain are defined in the frequency direction.

As illustrated in FIG. 28, at a carrier c1, the first and second domains exist. At carriers c2 and c3, the second and third domains exist. The third and fourth domains do not overlap in the frequency direction. The "division in the frequency direction" is defined with these cases included. For example, a frame may be subjected to frequency division such that a plurality of frames exist at a certain frequency (carrier) as illustrated in FIG. 28. Alternatively, a subframe may be subjected to frequency division such that a plurality of subframes exist at a certain frequency (carrier) as illustrated in FIG. 28.

Furthermore, as indicated by the first to third domains illustrated in FIG. 28, a domain may have different frequency widths at different times. That is, a domain need not be rectangular in a time-frequency plane. The "division in the frequency direction" is defined with these cases included.

In addition, when a frame and/or a subframe is subjected to time and frequency domain division (or time-and-frequency-domain-division multiplexing), the division in the time direction may be performed as illustrated in FIG. 27 and the division in the frequency direction may be performed as illustrated in FIG. 28. That is, a domain of a frame or a subframe in a time-frequency plane may have different frequency widths at different times and different time widths at different frequencies.

In the above description, for example, FIG. 19A illustrates transmission beams of a frame, and FIG. 19B illustrates streams of a frame. Transmission beams and streams both correspond to modulated symbol sequences transmitted to terminals.

Figure 29:
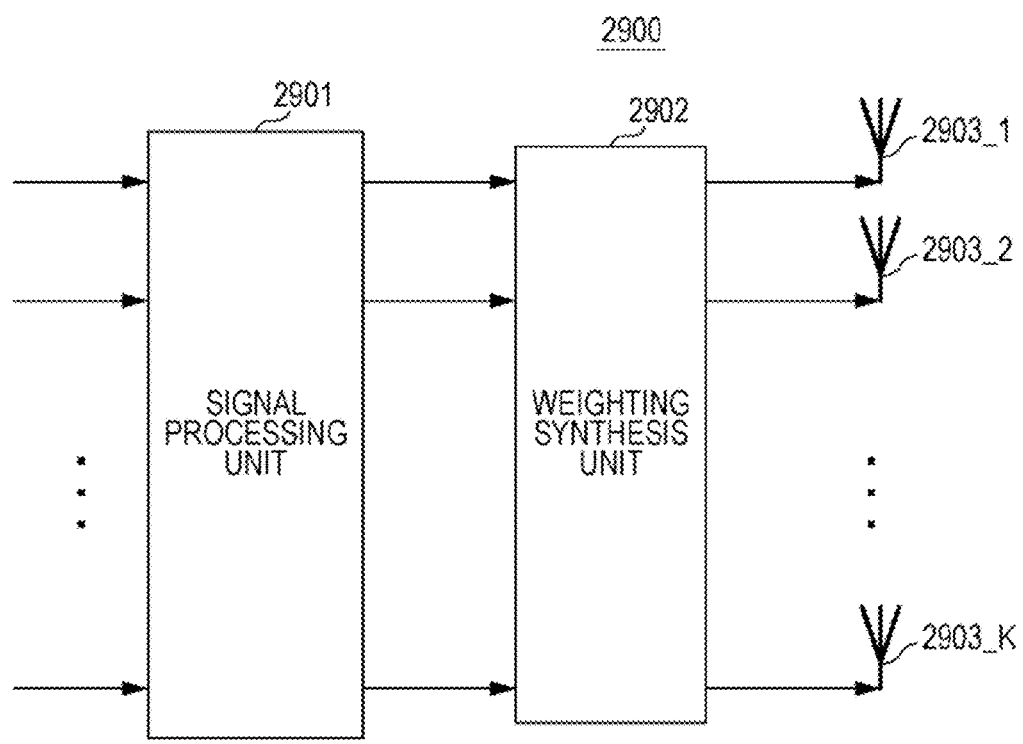
FIG. 29 is a diagram illustrating an example of the basic configuration of a communication apparatus according to the embodiment.

An example of the basic configuration of a communication apparatus such as the base station or the access point that has been described in detail above will be described with reference to FIG. 29. A communication apparatus 2900 according to the present embodiment includes a signal processor 2901 (e.g., corresponds to the signal processor 102 illustrated in FIGS. 1 and 3) that adjusts transmission timings and/or frequencies of modulated symbol sequences for each terminal such that the modulated symbol sequences are transmitted using a frame corresponding to a communicable range within which the terminal is located among a plurality of frames based on time and frequency bands and a weighting synthesizer 2902 (e.g., corresponds to the multiplication units 204_1 to 204_4 illustrated in FIG. 2 or the weighting synthesizer 301 illustrated in FIG. 3) that weights the modulated symbol sequences and transmits the modulated symbol sequences from antennas. Each frame is set such that the number of modulated symbol sequences that can be simultaneously transmitted in the same period of time and the same frequency band becomes different between communicable ranges. In addition, each frame includes a plurality of subframes specified by performing time division and/or frequency division on the frame. The signal processor 2901 assigns, to each of the plurality of subframes of each frame, modulated symbol sequences equal to or fewer than the number of modulated symbol sequences that can be simultaneously transmitted set for the frame.

In the above description, there has been a sentence, "An upper limit of the sum of average transmission power is determined to be a certain value regardless of the number of transmission beams (or the number of modulated signals to be transmitted)". A supplementary explanation of this will be given hereinafter.

It is assumed, for example, that a transmission device of a base station or a terminal includes a total of four transmission antennas, namely a transmission antenna #A, a transmission antenna #B, a transmission antenna #C, and a transmission antenna #D.

In a first case, for example, the transmission antenna #A transmits a modulated signal A with an average transmission power of 1 watt, the transmission antenna #B transmits a modulated signal B with an average transmission power of 1 watt, the transmission antenna #C transmits a modulated signal C with an average transmission power of 1 watt, and the transmission antenna #D transmits a modulated signal D with an average transmission power of 1 watt. In the first case, the sum of average transmission power is 4 watts.

In a second case, the transmission antenna #A transmits the modulated signal A with an average transmission power of a watt, the transmission antenna #B transmits the modulated signal B with an average transmission power of b watt, the transmission antenna #C transmits the modulated signal C with an average transmission power of c watt, and the transmission antenna #D transmits the modulated signal D with an average transmission power of d watt. It is assumed that a, b, c, and d are real numbers equal to or larger than 0.

When the same upper limit of the sum of average transmission power is employed in the second case and the first case, that is, when the upper limit of the sum of average transmission power in the second case is 4 watts, $a+b+c+d=4$ watts applies; however, $a+b+c+d \leq 4$ may be used, instead. Although a case in which there are four modulated signals has been described in the first and second cases, the above rule (the rule that the upper limit of the sum of average transmission power be determined to be a certain value) applies regardless of the number of modulated signals.

In addition, although a case in which modulated signals are transmitted has been described in the first and second cases, the same rule also applies when transmission beams (or streams), not modulated signals, are transmitted.

More specifically, in a third case, for example, a transmission beam (or a stream) E is transmitted with an average transmission power of 1 watt, a transmission beam (or a stream) F is transmitted with an average transmission power of 1 watt, a transmission beam (or a stream) G is transmitted with an average transmission power of 1 watt, and a transmission beam (or a stream) H is transmitted with an average transmission power of 1 watt. In the third case, the sum of average transmission power is 4 W.

In a fourth case, the transmission beam (or the stream) E is transmitted with an average transmission power of e watt, the transmission beam (or the stream) F is transmitted with an average transmission power off watt, the transmission beam (or the stream) G is transmitted with an average transmission power of g watt, and the transmission beam (or the stream) H is transmitted with an average transmission power of h watt. It is assumed that e, f, g, and h are real numbers equal to or larger than 0.

When the same upper limit of the sum of average transmission power is employed in the third and fourth cases, that is, when the upper limit of the sum of average transmission power in the fourth case is 4 watts, $e+f+g+h=4$ watts applies; however, $e+f+g+h$ may be used, instead. Although a case in which there are four transmission beams (streams) has been described in the third and fourth cases, the above rule (the rule that the upper limit of the sum of average transmission power be determined to be a certain value) applies regardless of the number of transmission beams.

Although the terms "frame" and "subframe" are used herein, the terms used are not limited to these. The essence of the present disclosure is not affected even if other terms such as "slot" and "sub-slot", "stream" and "sub-stream", or "segment", and "sub-segment" are used.

It is needless to say that the embodiments and other elements described herein may be combined with one another and implemented.

In addition, the embodiments and other elements are merely examples and although a "modulation method, a method of error correction coding (error correction codes, a code length, and a code rate used, etc.), control information, and the like" are taken as an example, for example, the embodiments and other elements can be implemented with the same configuration by applying other types of "modulation method, method of error correction coding (error correction codes, a code length, and a code rate used, etc.), control information, and the like".

With respect to the modulation method, the embodiments and other elements described herein can be implemented even if a modulation method other than the modulation method described herein is used. For example, amplitude and phase-shift keying (APSK) (e.g., 16-APSK, 64-APSK, 128-APSK, 256-APSK, 1024-APSK, 4096-APSK, etc.), pulse-amplitude modulation (PAM) (e.g., 4-PAM, 8-PAM, 16-PAM, 64-PAM, 128-PAM, 256-PAM, 1024-PAM, 4096-PAM, etc.), phase-shift keying (PSK) (e.g., binary PSK (BPSK), quadrature PSK (QPSK), 8-PSK, 16-PSK, 64-PSK, 128-PSK, 256-PSK, 1024-PSK, 4096-PSK, etc.), quadrature amplitude modulation (QAM) (e.g., 4-QAM, 8-QAM, 16-QAM, 64-QAM, 128-QAM, 256-QAM, 1024-QAM, 4096-QAM, etc.), or the like may be used, and uniform mapping or non-uniform mapping may be performed in each modulation method. In addition, a method for arranging 2, 4, 8, 16, 64, 128, 256, or 1024 signal points or the like (a modulation method including 2, 4, 8, 16, 64, 128, 256, or 1024 signal points or the like) on an in-phase/quadrature (I-Q) plane is not limited to a method for arranging signal points in the modulation method described herein.

The transmission device herein is considered to be included in a communication/broadcasting apparatus such as a broadcasting station, a base station, an access point, a terminal, or a mobile phone. At this time, the reception device is considered to be included in a communication apparatus such as a television set, a radio, a terminal, a personal computer, a mobile phone, an access point, or a base station. In addition, the communication apparatus in the present disclosure may be an apparatus having a communication function, and a mode may be employed in which the apparatus can be connected to an apparatus for executing an application, such as a television set, a radio, a personal computer, or a mobile phone, through a some kind of interface. In addition, in the present embodiment, symbols other than data symbols, such as pilot symbols (preambles, unique words, postambles, reference symbols, etc.) or symbols for control information, may be arranged in a frame in any manner. Although such symbols are called pilot symbols and symbols for control information here, any names may be used because what matters are functions.

The pilot symbols may be any known symbols modulated in transmission and reception devices using PSK modulation (or the reception device may synchronize the symbols transmitted from the transmission device to identify the symbols). The reception device performs frequency synchronization, time synchronization, channel estimation (CSI) (of each modulated signal), detection of signals, and the like using these symbols.

In addition, the symbols for control information are symbols for transmitting information (e.g., a modulated method, a method of error correction coding, a code rate of the method of error correction coding used for communication, setting information in a higher layer, etc.) necessary to be transmitted to a communication target in order to achieve communication of information other than data (such as an application).

The present disclosure is not limited to the embodiments and may be modified in various manners and implemented. For example, although a case in which a communication apparatus achieves the present disclosure has been described in the embodiments, the present disclosure is not limited to this. The communication method may be implemented as software, instead.

For example, a program for achieving the communication method may be stored in a read-only memory (ROM), and a central processor (CPU) may execute the program.

In addition, the program for achieving the communication method may be stored in a computer-readable storage medium. The program stored in the storage medium may be recorded in a random-access memory (RAM) of a computer, and the computer may operate in accordance with the program.

In addition, the components described in the above embodiments and the like may be achieved through large-scale integration (LSI) typically as an IC. Each of these may be individually fabricated as a chip, or some or all of the components in each embodiment may be fabricated as a chip. Although the term LSI is used here, a term such as IC, system LSI, super-LSI, ultra-LSI may be used, instead, depending on a degree of integration. A method for fabricating an integrated circuit is not limited to LSI, and an integrated circuit may be achieved by a dedicated circuit or a general-purpose processor. A field-programmable gate array (FPGA) that can be programmed after an LSI circuit is fabricated or a reconfigurable processor that can reconfigure connections and settings of circuit cells inside an LSI circuit may be used. Furthermore, if a technique for fabricating an integrated circuit that replaces LSI appears as a result of evolution of semiconductor technologies or derivative technologies, the function blocks may naturally be integrated using the technique. One such possibility is application of biotechnology.

It is suitable to use the present disclosure as a communication apparatus such as a base station, an access point, or a terminal.

What is claimed is:

1. A communication apparatus comprising:
a receiver, which comprises a plurality of antenna elements and which, in operation, receives from a base station apparatus a modulated signal mapped to one of a plurality of subframes defined in a frame corresponding to a communicable range to which the communication apparatus belongs, wherein the plurality of subframes are defined by time-division, frequency-division, or time-and-frequency division of the frame, and wherein a maximum number of modulated signals that can be simultaneously transmitted in a subframe from the base station apparatus varies depending on the communicable range; and
a decoder, which, in operation, decodes the received modulated signal.

2. The communication apparatus according to claim 1, wherein
the modulated signal is transmitted using directive transmission from the base station apparatus.

3. The communication apparatus according to claim 1, wherein
as the communicable range becomes smaller, the maximum number of modulated signals that can be simultaneously transmitted from the base station apparatus in the frame becomes larger.

4. The communication apparatus according to claim 1, wherein
as the communicable range becomes smaller, the maximum number of modulated signals that can be simultaneously transmitted from the base station apparatus in the subframe becomes larger.

5. The communication apparatus according to claim 1, wherein
an outer edge of the communicable range is defined by a distance from the base station apparatus.

6. The communication apparatus according to claim 1, wherein
when a plurality of modulated signals are simultaneously transmitted from the base station apparatus, each of the plurality of modulated signals is mapped to a corresponding one of the plurality of subframes defined in the frame.

7. The communication apparatus according to claim 1, wherein
a plurality of modulated signals are simultaneously transmitted from the base station apparatus in a same time period and in a same frequency band.

8. The communication apparatus according to claim 1, wherein
a first number of modulated signals is a maximum number of transmission beams that can be simultaneously transmitted in a same time period and in a same frequency band within a first communicable range;
a second number of modulated signals is a maximum number of transmission beams that can be simultaneously transmitted in a same period of time and in a same frequency band within a second communicable range that is exclusive of the first communicable range; and
the first number of modulated signals is larger than the second number of modulated signals.

9. The communication apparatus according to claim 8, wherein
a third number of modulated signals is a maximum number of transmission beams that can be simultaneously transmitted in a same period of time and in a same frequency band within a third communicable range that is exclusive of the second communicable range, and
the second number of modulated signals is larger than the third number of modulated signals.

10. A communication method for a communication apparatus, the communication method comprising:
receiving from a base station apparatus a modulated signal mapped to one of a plurality of subframes defined in a frame corresponding to a communicable range to which the communication apparatus belongs, wherein the plurality of subframes are defined by time-division, frequency-division, or time-and-frequency division of the frame, and wherein a maximum number of modulated signals that can be simultaneously transmitted in a subframe from the base station apparatus varies depending on the communicable range; and
decoding the received modulated signal.

11. The communication method according to claim 10, wherein
the modulated signal is transmitted using directive transmission from the base station apparatus.

12. The communication method according to claim 10, wherein
as the communicable range becomes smaller, the maximum number of modulated signals that can be simultaneously transmitted from the base station apparatus in the frame becomes larger.

13. The communication method according to claim 10, wherein
as the communicable range becomes smaller, the maximum number of modulated signals that can be simultaneously transmitted from the base station apparatus in the subframe becomes larger.

14. The communication method according to claim 10, wherein
an outer edge of the communicable range is defined by a distance from the base station apparatus.

15. The communication method according to claim 10, wherein
when a plurality of modulated signals are simultaneously transmitted from the base station apparatus, each of the plurality of modulated signals is mapped to a corresponding one of the plurality of subframes defined in the frame.

16. The communication method according to claim 10, wherein
a plurality of modulated signals are simultaneously transmitted from the base station apparatus in a same time period and in a same frequency band.

17. The communication method according to claim 10, wherein
a first number of modulated signals is a maximum number of transmission beams that can be simultaneously transmitted in a same time period and in a same frequency band within a first communicable range;
a second number of modulated signals is a maximum number of transmission beams that can be simultaneously transmitted in a same period of time and in a same frequency band within a second communicable range that is exclusive of the first communicable range; and
the first number of modulated signals is larger than the second number of modulated signals.

18. The communication method according to claim 17, wherein
a third number of modulated signals is a maximum number of transmission beams that can be simultaneously transmitted in a same period of time and in a same frequency band within a third communicable range that is exclusive of the second communicable range, and
the second number of modulated signals is larger than the third number of modulated signals.

* * * * *